United States Patent
Suzuki et al.

(10) Patent No.: US 8,991,564 B2
(45) Date of Patent: Mar. 31, 2015

(54) DISK BRAKE

(75) Inventors: Shinji Suzuki, Minami-ALPS (JP);
Takahiro Tokunaga, Minami-ALPS (JP); Yuichi Kobayashi, Sagamihara (JP); Yasuhisa Omata, Yokohama (JP); Jun Watanabe, Yokohama (JP); Seunghwan Park, Mito (JP); Akihiro Sato, Naka (JP); Satoshi Hirano, Hitachi (JP); Kazutaka Okamoto, Naka-gun (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 423 days.

(21) Appl. No.: 13/240,142

(22) Filed: Sep. 22, 2011

(65) Prior Publication Data
US 2012/0103734 A1    May 3, 2012

(30) Foreign Application Priority Data

Oct. 29, 2010 (JP) .................................. 2010-244693
Jun. 29, 2011 (JP) .................................. 2011-144088

(51) Int. Cl.
*F16D 65/02* (2006.01)
*B23K 20/12* (2006.01)
*F16D 55/226* (2006.01)
*F16D 121/04* (2012.01)

(52) U.S. Cl.
CPC ............ *B23K 20/122* (2013.01); *B23K 20/124* (2013.01); *F16D 55/226* (2013.01); *B23K 2201/006* (2013.01); *B23K 2203/10* (2013.01); *F16D 2121/04* (2013.01)
USPC ........................................ 188/72.4; 188/370

(58) Field of Classification Search
USPC .................................................. 188/72.4, 370
See application file for complete search history.

(56) References Cited

U.S. PATENT DOCUMENTS

| 3,478,650 | A | * | 11/1969 | Schrader | .......................... 92/168 |
| 3,497,038 | A | * | 2/1970 | Anders et al. | ................. 188/370 |
| 4,428,461 | A | * | 1/1984 | Warwick | ....................... 188/72.4 |
| 5,228,725 | A | * | 7/1993 | Aoyagi et al. | ............. 285/141.1 |
| 6,312,020 | B1 | * | 11/2001 | Ketcham et al. | ........... 285/142.1 |
| 2009/0101454 | A1 | | 4/2009 | Nanri et al. | |

FOREIGN PATENT DOCUMENTS

| GB | 2012012 | A | * | 7/1979 |
| JP | 2007-225057 | | | 9/2007 |
| JP | 2007285344 | A | * | 11/2007 |
| JP | 2009-103187 | | | 5/2009 |

OTHER PUBLICATIONS

Office Action issued Dec. 19, 2014 in corresponding Japanese patent application No. 2011-144088 (with English translation).

* cited by examiner

*Primary Examiner* — Bradley King
(74) *Attorney, Agent, or Firm* — Wenderoth, Lind & Ponack, LLP

(57) ABSTRACT

A disk brake includes a caliper body having a cylinder portion (25) with a cylindrical shape. The cylinder portion (25) has a bore (30) with a bottom (34) formed by integrally joining together an opening peripheral edge (98) at the bottom side of the cylinder portion (25) and a bottom cover member (92) to be fitted to the opening peripheral edge (98) through friction stir welding. The bottom cover member (92) has a disk shape and is friction-stir-welded along the outer periphery thereof. The terminating point of the friction stir welding is within the boundaries of the bottom cover member (92).

3 Claims, 16 Drawing Sheets

US 8,991,564 B2

DISK BRAKE

BACKGROUND OF THE INVENTION

The present invention relates to disk brakes.

There has been disclosed a technique for disk brakes by which the bottom of a caliper body is formed by joining a discrete bottom cover member to the caliper body through friction stir welding (for example, see Japanese Patent Application Publication No. 2007-225057).

If the bottom of the caliper body is formed by friction stir welding as disclosed in Japanese Patent Application Publication No. 2007-225057 and the terminating point of the friction stir welding is outside the boundaries of the bottom cover member, the material of the caliper body that is melted by the friction stir welding may remain as burrs on the inside of the bore of the caliper body. Such burrs are likely to have an adverse effect on the slidability of the piston.

SUMMARY OF THE INVENTION

Accordingly, an object of the present invention is to provide a disk brake capable of obtaining a caliper body having no adverse effect on the slidability of the piston.

To attain the above-described object, the present invention provides a disk brake in which the terminating point of friction stir welding is within the boundaries of the bottom cover member.

The present invention makes it possible to obtain a caliper body having a satisfactory configuration.

DETAILED DESCRIPTION OF THE INVENTION

Embodiments of the present invention will be explained below in detail with reference to the accompanying drawings.

[First Embodiment]

A first embodiment of the present invention will be explained below with reference to FIGS. 1 to 5.

The disk brake of the first embodiment is a disk brake for braking a four-wheeled automobile.

Figure 1:
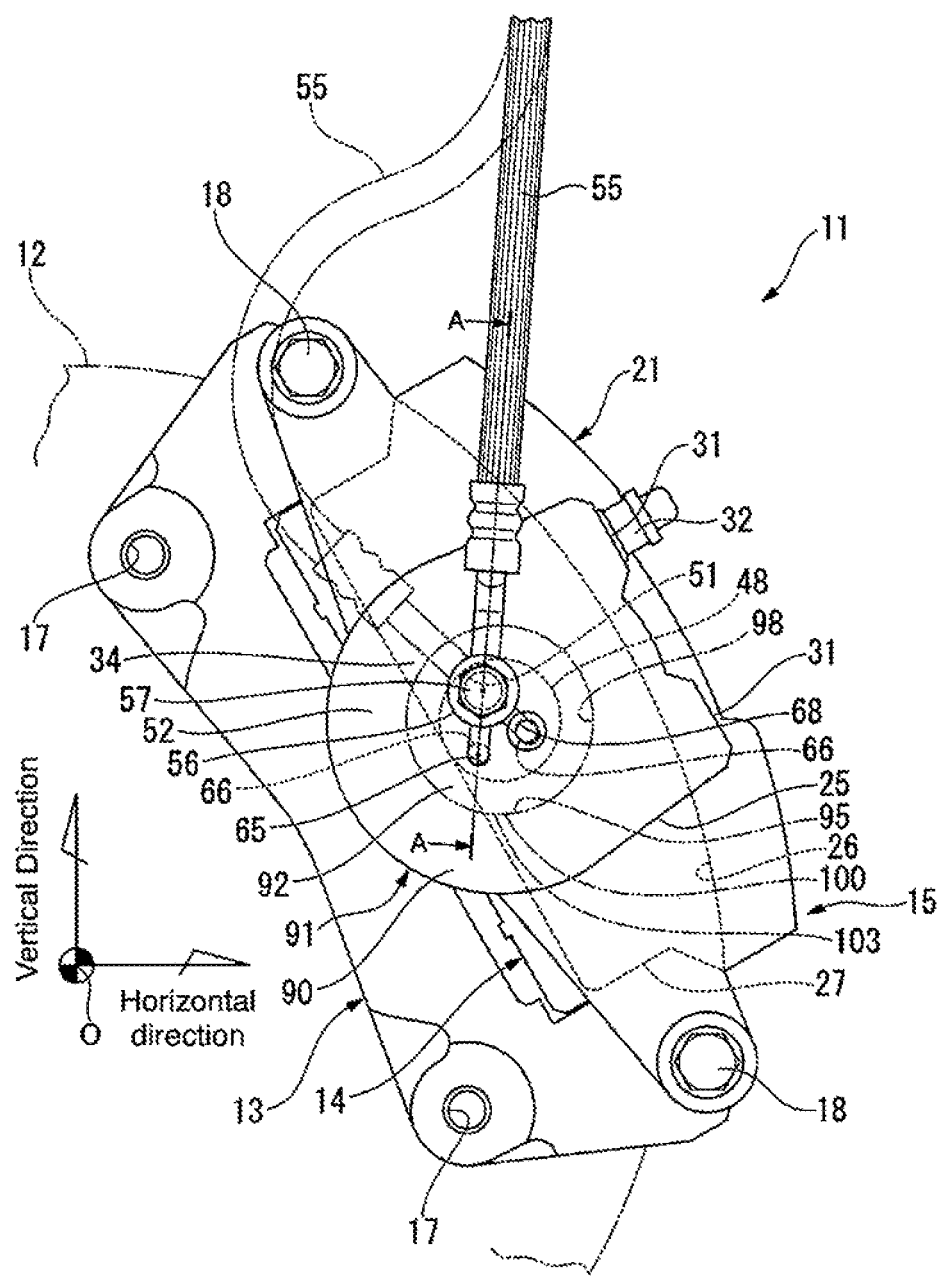
FIG. 1 is a rear view of a disk brake according to a first embodiment of the present invention.

As shown in FIG. 1, the disk brake 11 brakes the rotation of a disk 12 rotating together with a wheel (not shown), which is to be braked. The disk brake 11 has a carrier 13, a pair of brake pads 14 (only one of them is shown in FIG. 1), and a caliper 15. It should be noted that, in the following description, the radial direction of the disk 12 will be referred to as "disk radial direction", and the axial direction of the disk 12 as "disk axial direction", and further the rotational direction of the disk 12 as "disk rotational direction".

The carrier 13 has mounting holes 17 extending in the disk axial direction at the opposite ends, respectively, in the disk rotational direction of an inner end portion of the carrier 13 as seen in the disk radial direction. The carrier 13 is secured to a non-rotating part of the vehicle with fasteners inserted through the mounting holes 17. The carrier 13 is disposed to extend over the outer periphery of the disk 12, being displaced vertically upward and toward one side in the horizontal direction with respect to the center O of rotation of the disk 12 when the carrier 13 is secured to the non-rotating part of the vehicle.

The pair of brake pads 14 are disposed to face the opposite sides, respectively, of the disk 12 and supported by the carrier 13 slidably in the axial direction of the disk 12.

The caliper 15 has sliding pins 18 attached to the opposite ends thereof in the disk rotational direction. The sliding pins 18 extend in the disk axial direction. The caliper 15 is disposed to extend over the outer periphery of the disk 12 and supported by the carrier 13 at the sliding pins 18 slidably in the disk axial direction. The caliper 15 presses the brake pads 14, which are supported by the carrier 13, against the disk 12 to apply frictional resistance to the disk 12.

The caliper 15 has a caliper body 21 extending over the outer periphery of the disk 12 and slidably supported by the carrier 13. The caliper 15 further has a piston 22 (shown in FIG. 2) retained by the caliper body 21 and disposed to face one side of the disk 12.

The caliper body 21 is, as shown in FIG. 1, formed of an aluminum alloy into an integral structure including a cylinder portion 25, a bridge portion 26, and a claw portion 27. It should be noted that the material of the caliper body 21 may be any metal, e.g. an iron-based alloy. The cylinder portion 25 is disposed to face the inner side of the disk 12, which is one side thereof. The bridge portion 26 extends in the disk axial direction at a position radially outward of the cylinder portion 25 to extend over the outer periphery of the disk 12. The claw portion 27 extends from an end of the bridge portion 26 at a side thereof remote from the cylinder portion 25 inward in the disk radial direction to face the outer side of the disk 12, which is the other side thereof. In other words, the caliper 15 has the caliper body 21 configured in a first type in which the cylinder portion 25 is provided at one side of the disk 12 and the claw portion 27 is provided at the other side of the disk 12 and further the bridge portion 26 is provided to extend over the outer periphery of the disk 12 to connect together the claw portion 27 and the cylinder portion 25.

The cylinder portion 25 is in the shape of a cylinder, one end of which is closed. The cylinder portion 25 has a bore 30 (shown in FIG. 2) formed therein to extend in the disk axial direction so as to open toward the claw portion 27, i.e. toward the disk 12. The piston 22 is fitted in the bore 30. The caliper 15 causes the piston 22 to be advanced toward the disk 12 (leftward in FIG. 2) by a hydraulic pressure introduced into the bore 30. Consequently, the piston 22 presses the inner brake pad 14 into contact with the disk 12. Counterforce to the pressing force from the piston 22 causes the sliding pins 18 to slide relative to the carrier 13 and thus moves the cylinder portion 25 away from the disk 12, causing the claw portion 27 to press the outer brake pad 14 into contact with the disk 12. Thus, the brake pads 14 at the opposite sides of the disk 12 are clamped and pressed against the disk 12 by the piston 22 and the claw portion 27, thereby generating frictional resistance, i.e. braking force.

As shown in FIG. 1, the cylinder portion 25 has a bleeder boss 31 formed on an outward end thereof in the disk radial direction. A bleeder plug 32 for removing air from the cylinder portion 25 is attached to the bleeder boss 31. The caliper body 21 is formed by using a cast material configured to be common to different manners of mounting to the vehicle. That is, the caliper body 21 can be mounted regardless of whether left or right hand mounting. Therefore, the caliper body 21 is provided with a pair of bleeder bosses 31 spaced from each other in the disk rotational direction, and configured in symmetry with respect to the center of the caliper body 21 in the disk rotational direction. It should be noted here that a claw portion of a conventional disk brake is provided with a recess extending therethrough in the disk axial direction, being recessed outward in the disk radial direction from the inner end edge of the claw portion in the disk radial direction, in order to allow a tool for cutting the bore 30 of the cylinder portion 25 to pass therethrough. Unlike the claw portion of the conventional disk brake, the claw portion 27 of this embodiment is not provided with the above-described recess, as shown by the dotted line in FIGS. 1 and 3.

Figure 2:
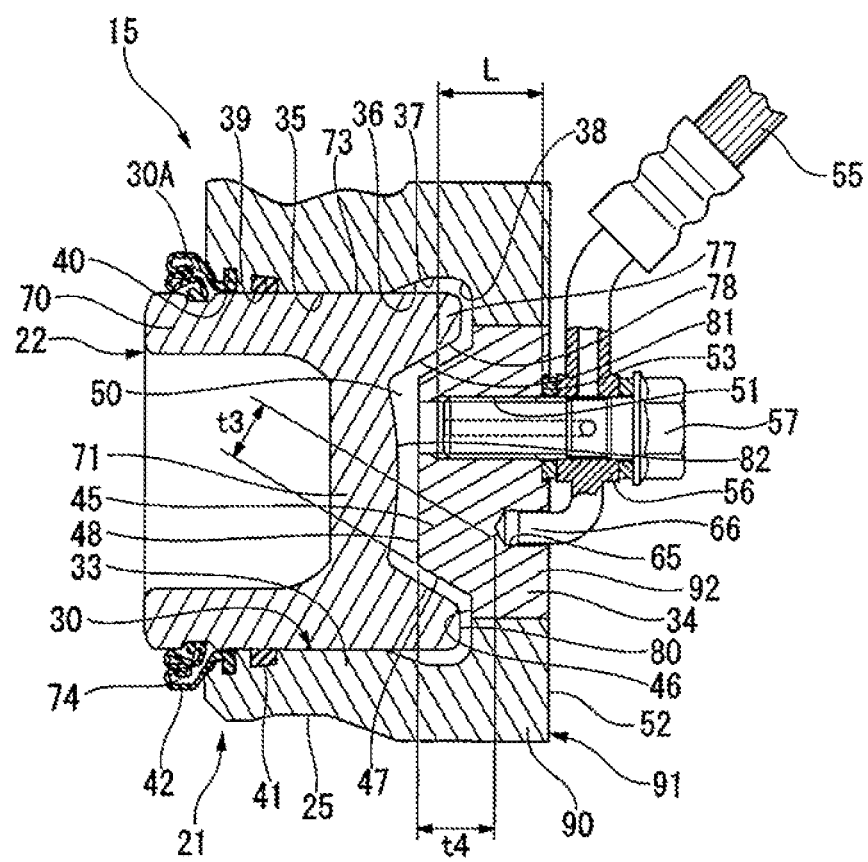
FIG. 2 is a sectional view taken along the line A-A in FIG. 1.

As shown in FIG. 2, the bore 30 of the cylinder portion 25 has an inner wall 33 generally extending in the disk axial direction and a bottom 34 generally extending perpendicularly to the disk axial direction.

The inner wall 33 has a small-diameter inner peripheral surface 35 having a predetermined fixed diameter and slidably fitted with the piston 22, a tapered inner peripheral surface 36 sloped from a bottom 34-side end of the small-diameter inner peripheral surface 35 so as to decrease in diameter with the distance toward the bottom 34, a large-diameter inner peripheral surface 37 extending from a bottom 34-side end of the tapered inner peripheral surface 36 toward the bottom 34 and having a diameter larger than the small-diameter inner peripheral surface 35, and an arcuate inner peripheral surface 38 sloped from a bottom 34-side end of the large-diameter inner peripheral surface 37 so as to decrease in diameter with the distance toward the inner part thereof. The small-diameter inner peripheral surface 35 has an annular peripheral seal groove 39 formed at a position closer to an opening 30A of the bore 30. The peripheral seal groove 39 is larger in diameter than the small-diameter inner peripheral surface 35. The small-diameter inner peripheral surface 35 further has an annular peripheral boot groove 40 formed between the peripheral seal groove 39 and the opening 30A of the bore 30 in the axial direction of the small-diameter inner peripheral surface 35. The peripheral seal groove 39 retains a piston seal 41 sealing between the small-diameter inner peripheral surface 35 and the piston 22. The peripheral boot groove 40 retains one end of a boot 42 interposed between the small-diameter inner peripheral surface 35 and the piston 22.

The bottom 34 of the bore 30 has a protrusion 45 projecting into the bore 30. A portion of the bottom 34 surrounding the protrusion 45 is the deepest in the bore 30 and forms an annular bottom surface 46 formed by a plane surface perpendicularly intersecting the disk axial direction. The outer peripheral edge of the bottom surface 46 connects with an end of the above-described arcuate inner peripheral surface 38 at a side thereof remote from the large-diameter inner peripheral surface 37. The protrusion 45 is in the shape of a frustum of cone having a tapered outer peripheral surface 47 taperingly projecting from the inner end edge of the bottom surface 46 and a top surface 48 formed by a circular flat surface located at a side of the tapered outer peripheral surface 47 remote from the bottom surface 46 and parallel to the bottom surface 46.

The above-described small-diameter inner peripheral surface 35, tapered inner peripheral surface 36, large-diameter inner peripheral surface 37, arcuate inner peripheral surface 38, peripheral seal groove 39, peripheral boot groove 40, bottom surface 46, tapered outer peripheral surface 47 and top surface 48 have a mutual center line extending in the disk axial direction. This center line coincides with the center line of the bore 30. Because the cast material constituting the caliper body 21 is configured in symmetry with respect to the center thereof in the disk rotational direction, as stated above, the center line of the bore 30 is disposed in an imaginary plane in the center of the caliper body 21 in the disk rotational direction.

Figure 3:
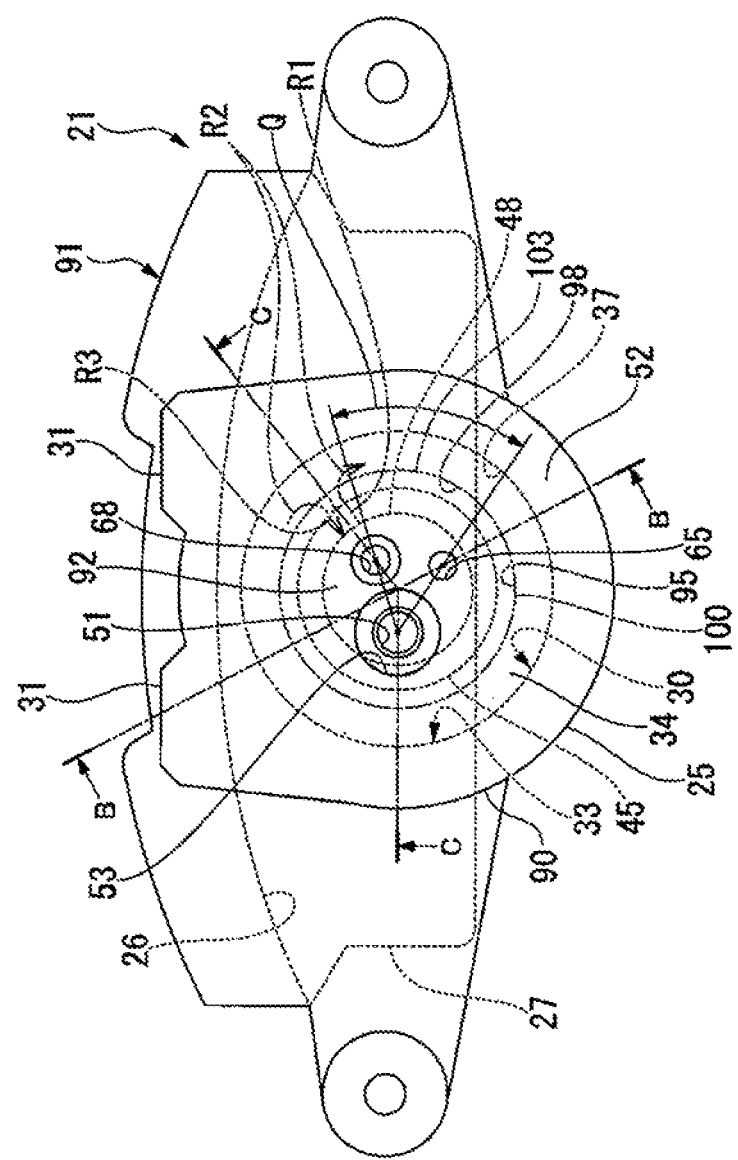
FIG. 3 is a rear view of a caliper body of the disk brake according to the first embodiment.

The cylinder portion 25 has an inlet hole 51 formed in the bottom 34 of the bore 30 to supply fluid pressure into a fluid chamber 50 formed in the bore 30. The inlet hole 51 is, as shown in FIG. 3, disposed at a position radially inward of the bore 30 and displaced from the center of the bore 30. In other words, the inlet hole 51 is displaced from the center of the caliper body 21 in the disk rotational direction, i.e. displaced from the center of the bore 30 toward one side in the disk rotational direction. In addition, the inlet hole 51 is, as shown in FIG. 2, formed to extend through the bottom 34 in the disk axial direction, i.e. in the axial direction of the bore 30. A shallow spot facing 53 is formed on an outer surface 52 of the bottom 34 in coaxial relation to the inlet hole 51.

The inlet hole 51 is formed on an imaginary line perpendicularly intersecting an imaginary line connecting the respective centers of the bore 30 and the disk 12. The inlet hole 51 is a threaded hole having an internal thread formed over the range L shown in FIG. 2. The inlet hole 51 is thread-engaged with a union bolt 57 that secures brake fluid piping 55 to the bottom 34 at a plug (piping plug) 56 and that communicates the piping 55 to the bore 30. More specifically, the inlet hole 51 extends in the axial direction of the bore 30 from the outer surface 52 of the bottom 34 to the top surface 48 of the protrusion 45. That is, as seen in the disk axial direction, the inlet hole 51 is, as shown in FIG. 3, entirely disposed within the boundaries of the protrusion 45. More specifically, the inlet hole 51 is, as shown in FIG. 1, entirely disposed within the boundaries of the top surface 48 of the protrusion 45. The spot facing 53 is also entirely disposed within the boundaries of the protrusion 45.

In addition, the bottom 34 of the bore 30 of the cylinder portion 25 has an anti-rotation detent hole 65 at a position radially inward of the bore 30 and displaced from the center of the bore 30. The detent hole 65 extends in the disk axial direction, i.e. in the axial direction of the bore 30, from the outer surface 52 to a halfway position as shown in FIG. 2. The detent hole 65 is smaller in diameter than the inlet hole 51. As shown in FIG. 3, the detent hole 65 is displaced from the center of the caliper body 21 in the disk rotational direction, i.e. displaced from the center of the bore 30, toward the other side in the disk rotational direction, opposite to the inlet hole 51. Further, the detent hole 65 is displaced from the center of the bore 30 inward in the disk radial direction (remote from the bridge portion 26). The detent hole 65 is, as shown in FIG. 2, fitted with a bent detent member 66 secured to the distal end of the plug 56 of the piping 55. Thus, when the union bolt 57 is screwed into the inlet hole 51, the plug 56 is restrained from rotating together with the union bolt 57. As seen in the disk axial direction, the detent hole 65 is also entirely disposed within the boundaries of the protrusion 45 as shown in FIG. 3. More specifically, the detent hole 65 is entirely disposed within the boundaries of the top surface 48 of the protrusion 45.

The caliper 15 is, as shown in FIG. 1, designed to be attached to the vehicle such that an imaginary line connecting the detent hole 65 and the inlet hole 51 is substantially parallel to the vertical direction. Accordingly, when the plug 56 having the detent portion 66 fitted in the detent hole 65 is secured to the bottom 34 with the union bolt 57, the piping 55 extends substantially parallel to the vertical direction as seen from the disk axial direction.

Figure 5:
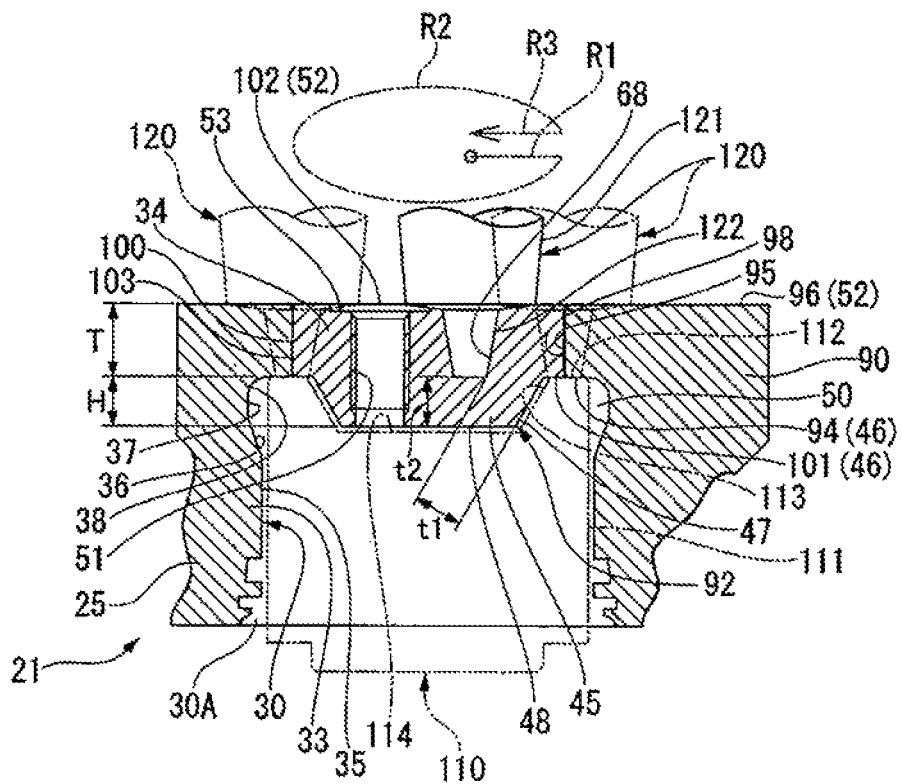
FIG. 5 is a sectional view taken along the line C-C in FIG. 3.

As shown in FIG. 3, the bottom 34 of the bore 30 of the cylinder portion 25 has a residual hole 68 at a position radially inward of the bore 30 and displaced from the center of the bore 30. The residual hole 68 occurs when the bottom 34 is formed by friction stir welding (FSW; described later). The residual hole 68 extends in the disk axial direction, i.e. in the axial direction of the bore 30, from the outer surface 52 to a halfway position as shown in FIG. 5. The residual hole 68 is tapered such that the diameter decreases with the distance toward the inner part thereof. As shown in FIG. 3, the residual hole 68 is displaced from the center of the caliper body 21 in the disk rotational direction, i.e. displaced from the center of the bore 30, toward the other side in the disk rotational direction, opposite to the inlet hole 51. Further, the residual hole 68 is displaced outward (toward the bridge portion 26) from the center of the bore 30 in the disk radial direction. That is, the residual hole 68 is formed at the same side as the detent hole 65 as seen in the disk rotational direction but at the opposite side to the detent hole 65 in the disk radial direction. As seen in the disk axial direction, the residual hole 68 is also entirely disposed within the boundaries of the protrusion 45. More specifically, the residual hole 68 is entirely disposed within the boundaries of the top surface 48 of the protrusion 45. It should be noted that the angle θ made by the detent hole 65 and the residual hole 68, which is the terminating point of friction stir welding, at the center of the inlet hole 51 is not less than 45 degrees.

As shown in FIG. 2, the piston 22 is formed in a cup-like shape having a substantially circular cylindrical tubular portion 70 and a substantially disk-shaped disk portion 71 formed at an intermediate position in the axial direction of the tubular portion 70, being one-sidedly disposed toward one side in the axial direction of the tubular portion 70 so as to close the inside of the tubular portion 70. The tubular portion 70 has an outer peripheral surface 73 with a predetermined fixed diameter. The tubular portion 70 has a peripheral boot groove 74 formed on an end of the outer peripheral surface 73 at a side thereof remote from the disk portion 71. The peripheral boot groove 74 is smaller in diameter than the outer peripheral surface 73 and retains the other end of the above-described boot 42 fitted therein.

The piston 22 has an outer bottom portion 77 formed by the disk portion 71 and an end of the tubular portion 70 at a side thereof toward which the disk portion 71 is one-sidedly disposed. The outer bottom portion 77 of the piston 22 is formed with a recess 78 recessed in the axial direction of the outer peripheral surface 73.

The end surface 80 of the outer bottom portion 77 of the piston 22 has a flat annular configuration perpendicularly intersecting the center line of the outer peripheral surface 73. The recess 78 of the piston 22 has a conical inner surface 81 extending inward from the inner end edge of the end surface 80. The conical inner surface 81 is tapered so that the diameter decreases with the distance toward the inside of the recess 78. The recess 78 further has a spherical bottom surface 82 located at a side of the conical inner surface 81 remote from the end surface 80 and having a substantially spherical configuration that is convex toward the end surface 80.

The above-described outer peripheral surface 73, peripheral boot groove 74, end surface 80, conical inner surface 81 and spherical bottom surface 82 have a mutual center line, which coincides with the center line of the piston 22. The outer bottom portion 77 and the recess 78 have respective center lines coincident with the center line of the piston 22.

The piston 22 is slidably fitted at the fixed-diameter outer peripheral surface 73 of the tubular portion 70 to the small-diameter inner peripheral surface 35 of the bore 30 and the inner peripheral surface of the piston seal 41. When fitted into the bore 30 in this way, the piston 22 is coaxial with the bore 30, with the center line thereof being coincident with that of the bore 30.

The piston 22 can abut at the end surface 80 against the bottom surface 46 of the bore 30 in a plane contact manner. When the piston 22 abuts against the bottom surface 46 of the bore 30 at the end surface 80, the recess 78 accommodates the protrusion 45 of the bottom 34 of the bore 30. In this abutting state, a clearance is formed throughout between the tapered outer peripheral surface 47 of the protrusion 45 and the conical inner surface 81 of the recess 78, and a clearance is also formed throughout between the top surface 48 of the protrusion 45 and the spherical bottom surface 82 of the recess 78. Further, in the abutting state, a clearance is also formed between the outer peripheral surface 73 of the piston 22, on the one hand, and, on the other, the tapered inner peripheral surface 36, large-diameter inner peripheral surface 37 and arcuate inner peripheral surface 38 of the bore 30 over the entire circumference.

In the first embodiment, the caliper body 21 comprises, as shown in FIG. 3, a caliper body main unit 91 including the claw portion 27, the bridge portion 26 and a cylinder constituting part 90 excluding the bottom 34 of the bore 30. The caliper body 21 further comprises a disk-shaped bottom cover member 92 forming the bottom 34 of the bore 30. The caliper body 21 is formed by integrally joining together the caliper body main unit 91 and the bottom cover member 92, which are discrete components, through friction stir welding. The caliper body main unit 91 and the bottom cover member 92 are each integrally formed by casting an aluminum alloy individually. Accordingly, the caliper body 21, which is formed by joining the caliper body main unit 91 and the bottom cover member 92, is made of aluminum alloy. It should be noted that the caliper body main unit 91 and the bottom cover member 92 may be produced by any of various forming methods, e.g. forging, or cutting, in addition to casting. Alternatively, the caliper body main unit 91 and the bottom cover member 92 may be formed by using different forming methods, respectively.

Figure 4:
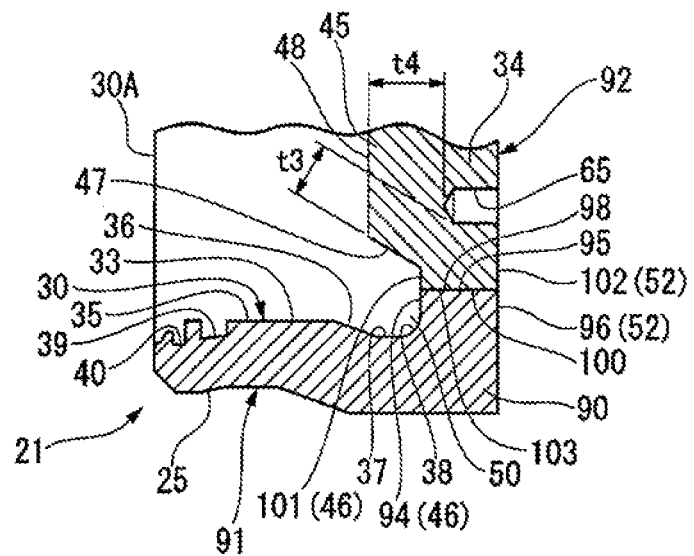
FIG. 4 is a sectional view taken along the line B-B in FIG. 3.

The caliper body main unit 91 is, as shown in FIG. 4, formed with a bottom constituting surface 94 constituting a part of a radially outer area of the bottom surface 46 of the bore 30 of the cylinder portion 25. The bottom constituting surface 94 is formed by a plane surface perpendicularly intersecting the center line of the bore 30. The bottom constituting surface 94 is formed in an annular configuration coaxial with the bore 30 and has a predetermined fixed width. The caliper body main unit 91 further has a fitting cylindrical surface 95 extending from the inner peripheral edge of the bottom constituting surface 94 in the shape of a circular cylindrical surface. The fitting cylindrical surface 95 has a predetermined fixed diameter and extends coaxially with the bore 30 along the axial direction of the bore 30 to the outside of the caliper body main unit 91. In addition, an outer-surface constituting surface 96 is formed to extend radially outward from a peripheral edge of the fitting cylindrical surface 95 at a side thereof remote from the bottom constituting surface 94. The outer-surface constituting surface 96 constitutes a part of a radially outer area of the outer surface 52 and is formed by a plane surface perpendicularly intersecting the center line of the bore 30. Accordingly, a space radially inward of the fitting cylindrical surface 95 forms an opening extending through the bottom 34 of the bore 30, and a peripheral edge of the opening, including the fitting cylindrical surface 95, forms an opening peripheral edge 98. Consequently, the cylinder constituting part 90 of the cylinder portion 25 formed in the caliper body main unit 91 does not have a bottomed cylindrical configuration, one end of which is closed, but a bottomless cylindrical configuration, both ends of which are open. The cast material for the caliper body main unit 91 is in symmetry at the front and rear parts thereof with respect to the center thereof in the disk rotational direction.

The bottom cover member 92 is formed in a disk shape and fitted to the fitting cylindrical surface 95 of the cylinder constituting part 90 of the caliper body main unit 91. The bottom cover member 92 has a fitting cylindrical surface 100, a bottom constituting surface 101, the above-described tapered outer peripheral surface 47, and the above-described top surface 48. The fitting cylindrical surface 100 is in the shape of a circular cylindrical surface with a predetermined fixed diameter, which forms a maximum outer diameter portion. The bottom constituting surface 101 extends inward, with a predetermined fixed width, from an edge of the fitting cylindrical surface 100 at one axial end thereof perpendicularly to the axial direction of the fitting cylindrical surface 100. The bottom constituting surface 101 is formed by an annular plane surface constituting a part of a radially inner area of the bottom surface 46 of the bore 30. The tapered outer peripheral surface 47 taperingly projects from the inner peripheral edge of the bottom constituting surface 101 toward one side in the axial direction in coaxial relation to the fitting cylindrical surface 100. The top surface 48 extends parallel to the bottom constituting surface 101 at a side of the tapered outer peripheral surface 47 remote from the bottom constituting surface 101. The bottom cover member 92 further has an outer-surface constituting surface 102 comprising a circular plane surface extending radially inward from an edge of the fitting cylindrical surface 100 at the other axial end thereof perpendicularly to the axial direction of the fitting cylindrical surface 100 to constitute a part of a radially inner area of the outer surface 52. Thus, the bottom cover member 92 has the whole of the protrusion 45 of the bottom 34 of the caliper body 21.

As shown in FIG. 5, the bottom cover member 92 has the protrusion 45 formed with a height H1 not less than a half of the distance between the bottom constituting surface 101 and the outer-surface constituting surface 102, which is a wall thickness T1 of the outer periphery of the bottom cover member 92.

The outer-surface constituting surface 102 defines the other side of the bottom cover member 92 relative to one side thereof where is formed the protrusion 45 having the tapered outer peripheral surface 47 and the top surface 48. The outer-surface constituting surface 102 is a flat surface extending perpendicular to the axial direction of the bottom cover member 92. The bottom cover member 92 has an outer peripheral edge 103 including the fitting cylindrical surface 100. With the outer peripheral edge 103 fitted to the opening peripheral edge 98 of the caliper body main unit 91, the bottom cover member 92 is joined to the caliper body main unit 91 by friction stir welding as will be explained below. That is, the bottom cover member 92 is friction-stir-welded to the caliper body main unit 91 along the outer peripheral edge 103 of the bottom cover member 92, and the caliper body main unit 91 is friction-stir-welded to the bottom cover member 92 along the opening peripheral edge 98 of the caliper body main unit 91.

It should be noted that, in FIGS. 2, 4, 5 and FIGS. 7 to 17, which will be explained later, the caliper body main unit 91 and the bottom cover member 92 are shown as discrete members before the friction stir welding process for the sake of explanation. Actually, the caliper body main unit 91 and the bottom cover member 92 are joined into one member after being subjected to friction stir welding. That is, the opening peripheral edge 98 including the fitting cylindrical surface 95 of the caliper body main unit 91 and the outer peripheral edge 103 including the fitting cylindrical surface 100 of the bottom cover member 92 disappear after the friction stir welding process.

To form the caliper body 21, first, a single piece of integral cast material for forming the caliper body main unit 91 is formed by casting an aluminum alloy. In the casting stage, the cast material for the caliper body main unit 91 has the claw portion 27, the bridge portion 26 and the cylinder constituting part 90, which are shown in FIG. 3. The cylinder constituting part 90 is in the shape of a cylinder, both ends of which are open, and has a starting hole therein. The inside of the starting hole in the cylinder constituting part 90 is cut with a cutting tool inserted from a side of the cast material remote from the claw portion 27 through a starting hole portion at the fitting cylindrical surface 95 shown in FIG. 4, thereby forming the small-diameter inner peripheral surface 35, the peripheral seal groove 39, the peripheral boot groove 40 and the fitting cylindrical surface 95 in the bore 30. As a result, the caliper body main unit 91 is formed with the cylinder constituting part 90, which is cylindrical, and both ends of which are open. In this embodiment, the caliper body main unit 91 has the tapered inner peripheral surface 36, the large-diameter inner peripheral surface 37, the arcuate inner peripheral surface 38, the bottom constituting surface 94 and outer-surface constituting surface 96, which are formed during the casting process. However, these surfaces may be formed by cutting to facilitate the formation of the surfaces during the casting process. In this way, the caliper body main unit 91 is prepared which has the cylinder constituting part 90 formed by cutting an aluminum alloy integral cast material, and which has the bridge portion 26 (shown in FIG. 3) extending in the axial direction of the cylinder constituting part 90 at a position radially outward of the cylinder constituting part 90 to extend over the outer periphery of the disk 12, and the claw portion 27 at a side of the bridge portion 26 remote from the cylinder constituting part 90 (hereinafter referred to as "caliper body main unit preparing step").

A disk-shaped, aluminum alloy integral cast material is cut to form the fitting cylindrical surface 100 (shown in FIG. 4), thereby preparing the bottom cover member 92 formed in a disk shape and having the protrusion 45 on one side thereof (hereinafter referred to as "bottom cover member preparing step"). It should be noted that, although the bottom cover member 92 has the bottom constituting surface 101, the tapered outer peripheral surface 47, the top surface 48 and the outer-surface constituting surface 102, which are formed during the casting process, these surfaces may be formed by cutting.

Next, as shown in FIG. 5, a core jig 110 is inserted into the bore 30 of the caliper body main unit 91 prepared in the above-described caliper body main unit preparing step, and the core jig 110 is held with an integrating jig (not shown), thereby integrating together the caliper body main unit 91 and the core jig 110. The core jig 110 is similar in configuration to the piston 22. That is, the core jig 110 has an outer peripheral surface 111 with a predetermined fixed diameter, a flat annular reference surface 112 extending perpendicular to the center line of the outer peripheral surface 111, a conical inner surface 113 extending inward from the inner end edge of the reference surface 112 taperingly such that the diameter of the conical inner surface 113 decreases with the distance toward the inside of the core jig 110, and a flat bottom surface 114 extending perpendicular to the center line of the outer peripheral surface 111 at a side of the conical inner surface 113 remote from the reference surface 112.

The outer peripheral surface 111, the reference surface 112, the conical inner surface 113 and the bottom surface 114 have a mutual center line, which coincides with the center line of the core jig 110. The core jig 110 is slidably fitted to the small-diameter inner peripheral surface 35 of the bore 30 at the outer peripheral surface 111, which has a predetermined fixed diameter. When fitted to the small-diameter inner peripheral surface 35 in this way, the core jig 110 has the reference surface 112 abutting against the bottom constituting surface 94 at a part of the outer diameter side of the reference surface 112. At this time, an annular clearance is formed between the outer peripheral surface 111 of the core jig 110, on the one hand, and, on the other, the tapered inner peripheral surface 36, large-diameter inner peripheral surface 37 and arcuate inner peripheral surface 38 of the caliper body main unit 91.

The caliper body main unit 91 integrated with the core jig 110 in this way is set in a friction stir welding apparatus, with the claw portion 27 side down. Subsequently, the bottom cover member 92 prepared in the above-descried bottom cover member preparing step is fitted at the fitting cylindrical surface 100 to the fitting cylindrical surface 95 of the cylinder constituting part 90 of the caliper body main unit 91, with the protrusion 45 side down. Consequently, the bottom cover member 92 has the protrusion 45 provided on one side thereof that faces into the bore 30. At this time, both the bottom constituting surface 94 of the caliper body main unit 91 and the bottom constituting surface 101 of the bottom cover member 92 abut against the same one reference surface 112. Thus, the bottom cover member 92 is positioned with respect to the caliper body main unit 91 in addition to achieving fitting between the fitting cylindrical surfaces 95 and 100 and fitting between the tapered outer peripheral surface 47 and the conical inner surface 113 of the core jig 110.

In this state, the outer peripheral edge 103, including the fitting cylindrical surface 100, of the bottom cover member 92 is integrally joined to the opening peripheral edge 98, including the fitting cylindrical surface 95, which constitutes the bottom 34 of the cylinder constituting part 90, by friction stir welding to form the bottom 34 of the bore 30 (hereinafter referred to as "friction stir welding step").

A welding tool 120 used in the friction stir welding step has a substantially circular columnar large-diameter shaft portion 121 and a distal shaft portion 122 coaxial with and smaller in diameter than the large-diameter shaft portion 121. The distal shaft portion 122 has a tapered frusto-conical configuration. When the welding tool 120 rotates at high speed, the distal shaft portion 122 causes the opening peripheral edge 98 of the cylinder constituting part 90 and the outer peripheral edge 103 of the bottom cover member 92 to be frictionally melted and stirred and thus welded together.

In the above-described friction stir welding step, the distal shaft portion 122 of the welding tool 120 rotating at high speed is moved as shown in FIG. 3. That is, a position where the residual hole 68 is to be formed is defined as a starting point, and the distal shaft portion 122 is moved from the starting point away from the center of the bore 30 along a radial route R1 in the radial direction of the bore 30 opposite to the direction in which the inlet hole 51 is to be formed with respect to the center of the bore 30. As shown in FIG. 5, when reaching a welding border between the opening peripheral edge 98 of the cylinder constituting part 90 and the outer peripheral edge 103 of the bottom cover member 92, the distal shaft portion 122 is switched at the welding border as a switching point to move along a circumferential route R2 in the circumferential direction of the bore 30. In this way, friction stir welding is performed circularly over the entire circumference of the opening peripheral edge 98 and the outer peripheral edge 103, thereby integrally welding the border between the bottom cover member 92 and the caliper body main unit 91. In other words, the welding tool 120 is moved to follow the border between the bottom cover member 92 and the caliper body main unit 91 so as to form a loop-shaped friction stir welding path.

After being moved along the circumferential route R2, the welding tool 120 is switched at the above-described switching point to move toward the center of the bore 30 along a radial route R3 parallel to the radial direction of the bore 30, which is opposite in direction to the radial route R1. After returning to the starting point, the welding tool 120 is pulled out of the caliper body 21. As a result, a residual hole 68 is formed by the distal shaft portion 122 of the welding tool 120. It should be noted that, in order to surely weld together the bottom cover member 92 and the caliper body main unit 91 by friction stir welding, the length of the distal shaft portion 122 of the welding tool 120 is set substantially the same as the thickness between the bottom constituting surface 94 (101) and the outer-surface constituting surface 96 (102) so that the tip position of the distal shaft portion 122 can substantially coincide with the bottom constituting surface 94 (101). Further, because the bottom cover member 92 is fitted to the conical inner surface 113 of the core jig 110 at the tapered outer peripheral surface 47 of the protrusion 45, the center of the bottom cover member 92 is kept coincident with the center of the bore 30 both during and after the friction stir welding step.

Moving the welding tool 120 along the above-described routes R1 to R3 allows the residual hole 68, which is the terminating point of the friction stir welding process, to be located within the boundaries of the bottom cover member 92 and within the boundaries of the protrusion 45 provided on one side of the bottom cover member 92 that faces into the bore 30. In addition, moving the welding tool 120 along the routes R1 to R3 prevents the distal shaft portion 122 of the welding tool 120 from radially traversing the clearance between the outer peripheral surface 111 of the core jig 110, on the one hand, and, on the other, the tapered inner peripheral surface 36, large-diameter inner peripheral surface 37 and arcuate inner peripheral surface 38 of the caliper body main unit 91 in the radial direction of the bore 30 during the friction stir welding step.

It should be noted that the opening peripheral edge 98 of the cylinder constituting part 90 and the outer peripheral edge 103 of the bottom cover member 92 are joined together by friction stir welding while being kept positioned by the core jig 110. Consequently, the bottom constituting surfaces 94 and 101 form the bottom surface 46, and the outer-surface constituting surfaces 96 and 102 form the outer surface 52. Thus, a weld (not shown) is formed by the opening peripheral edge 98 of the cylinder constituting part 90 and the outer peripheral edge 103 of the bottom cover member 92, which are melted and integrated together by friction stir welding before being solidified. The weld is substantially in the shape of a ring centered at the center axis of the bore 30. As seen in a sectional view taken by a plane containing the center axis of the bore 30, the weld has a configuration in which the width decreases with the distance toward the bore 30.

The caliper body 21 comprising the caliper body main unit 91 and the bottom cover member 92 joined together in the above-described friction stir welding step has a protrusion 45 formed as a consequence of the friction stir welding process. The protrusion 45 projects more toward the inside of the bore 30 than the bottom surface 46 of the bore 30.

It should be noted that the outer surface 52 has a substantially annular weld formed thereon being centered at the center axis of the bore 30. If the weld has a rough surface, the surface may be flattened by milling.

Next, the caliper body 21 comprising the caliper body main unit 91 and the bottom cover member 92 joined together in the above-described friction stir welding step is provided with an inlet hole 51 for supplying fluid pressure into the bore 30, a spot facing 53 and a detent hole 65, which are drilled, from the outside, in the bottom 34 of the bore 30 formed by the bottom cover member 92 (hereinafter referred to as "inlet and other hole drilling step"). The inlet hole 51 is provided within the boundaries of the protrusion 45 to extend through between the top surface 48, which is one side of the bottom cover member 92 where the protrusion 45 is formed, and the outer-surface constituting surface 102, which is the other side of the bottom cover member 92. The residual hole 68, the inlet hole 51 and the detent hole 65 are all displaced from the center of the bore 30 and also displaced from the center of the bottom cover member 92, which coincides with the center of the bore 30.

To manufacture the caliper 15 and hence the disk brake 11 by using the caliper body 21 formed as stated above, the piston seal 41 is fitted into the peripheral seal groove 39 shown in FIG. 2 and one end of the boot 42 shown in FIG. 2 is fitted into the peripheral boot groove 40 from between the claw portion 27 and the cylinder portion 25. Further, the piston 22 is inserted into the bore 30 from between the claw portion 27 and the cylinder portion 25, and the other end of the boot 42 is fitted into the peripheral boot groove 74 of the piston 22. In addition, the sliding pins 18 and the bleeder plug 32, which are shown in FIG. 1, are attached to the caliper body 21. Thus, the caliper 15 is set up.

To the caliper 15 set up as stated above, the piping 55 is attached as shown in FIGS. 1 and 2. More specifically, the bent detent member 66 secured to the plug 56 of the piping 55 is engaged with the detent hole 65, and in this state, the union bolt 57 is inserted through the plug 56 and screwed into the inlet hole 51. Consequently, the plug 56 of the piping 55 is secured to the caliper 15, together with the union bolt 57, in the state of being prevented from rotating by the detent portion 66 and the detent hole 65, and the piping 55 communicates with the bore 30. At this time, the plug 56 abuts against the spot facing 53 to ensure its perpendicularity to the inlet hole 51.

The caliper 15 is installed on the vehicle, and a brake fluid is filled into the bore 30 of the caliper body 21 by vacuum drawing. At this time, a vacuum of vacuum drawing causes the piston 22 to be pulled inward of the bore 30, resulting in the end surface 80 of the piston 22 abutting against the bottom surface 46 of the bore 30. However, even in this state, the recess 78 of the piston 22 for accommodating the protrusion 45 of the bottom 34 of the bore 30 faces the protrusion 45 across a clearance. Therefore, the piston 22 is prevented from sticking to the bottom 34 of the bore 30.

The corner between the inner wall 33 and bottom 34 of the bore 30 is provided with the above-described arcuate inner peripheral surface 38 for relaxation of stress concentration. To avoid interference with the end surface 80 of the piston 22, the arcuate inner peripheral surface 38 is disposed radially outer than the small-diameter inner peripheral surface 35 of the bore 30, which guides the piston 22. Consequently, an annular clearance occurs between the core jig 110, on the one hand, and, on the other, the tapered inner peripheral surface 36, the large-diameter inner peripheral surface 37 and the arcuate inner peripheral surface 38. In the case of a disk brake used in a four-wheeled automobile and having a high fluid pressure load, in particular, the radius of the arcuate inner peripheral surface 38 needs to be increased; therefore, the above-described clearance undesirably widens. In the disk brake disclosed in Japanese Patent Application Publication No. 2007-225057 described above, when the bottom cover member is joined to the opening peripheral edge of the caliper body main unit by friction stir welding, the friction stir welding terminating point of the welding tool is outside the boundaries of the bottom cover member. Accordingly, if the structure of Japanese Patent Application Publication No. 2007-225057 is applied, the aluminum material melted by friction stir welding may flow into the radial clearance between the bore and the core jig and remain as burrs. Such burrs may adversely affect the slidability of the piston. In other words, when the bottom of the caliper body is formed by friction stir welding, if the friction stir welding terminating point of the welding tool is outside the boundaries of the bottom cover member, the friction-stirred aluminum material may adversely affect the slidability of the piston.

In contrast to the above, according to the disk brake 11 of the first embodiment, the friction stir welding starting and terminating points are within the boundaries of the bottom cover member 92, as shown in FIG. 5. Therefore, the opening peripheral edge 98 of the caliper body main unit 91 and the outer peripheral edge 103 of the bottom cover member 92, which is to be fitted to the opening peripheral edge 98, can be integrally joined together by moving the friction stir welding tool 120 without traversing the radial clearance between the core jig 110 and the bore 30. Accordingly, it is possible to obtain the caliper body 21 having a favorable configuration capable of suppressing the degradation of the sliding performance of the piston 22.

Further, because the terminating point of friction stir welding is within the boundaries of the protrusion 45, it is possible to ensure the distance between the residual hole 68, which is formed at the friction stir welding terminating point, and the fluid chamber 50 in the bore 30 even if the friction stir welding terminating point is within the boundaries of the bottom cover member 92. Therefore, it is possible to improve durability against the load of brake fluid pressure during braking That is, the lateral thickness t1 between the residual hole 68 and the tapered outer peripheral surface 47 of the protrusion 45 can be ensured to be a thickness capable of enduring the fluid pressure load.

Moreover, because the protrusion 45 has a height H not less than a half of the wall thickness T of the outer periphery of the bottom cover member 92, it is possible to ensure the distance between the residual hole 68 and the fluid chamber 50 in the bore 30 even more surely. Accordingly, it is possible to improve durability against the load of brake fluid pressure during braking That is, the axial thickness t2 between the residual hole 68 and the top surface 48 of the protrusion 45 can be ensured to be a thickness capable of enduring the fluid pressure load.

Further, as shown in FIG. 2, the inlet hole 51 for supplying fluid pressure into the bore 30 is provided to extend through between the top surface 48 of the protrusion 45, which is one side of the bottom cover member 92, and the outer-surface constituting surface 102, which is the other side of the bottom cover member 92, within the boundaries of the protrusion 45. Therefore, it is possible to ensure the thread length L of the inlet hole 51, i.e. the thread engagement length of the union bolt 57 fitted into the inlet hole 51. Thus, the inlet hole 51 can satisfactorily endure tightening force applied thereto when the piping 55 is attached to the bottom 34 by screwing the union bolt 57 into the inlet hole 51.

Further, because the detent hole 65, which is fitted with the detent portion 66 of the plug 56 connected to the inlet hole 51, is provided within the boundaries of the protrusion 45 as shown in FIG. 4, it is possible to ensure the distance between the detent hole 65 and the fluid chamber 50 in the bore 30. Accordingly, it is possible to improve durability against the load of brake fluid pressure during braking That is, the lateral thickness t3 between the detent hole 65 and the tapered outer peripheral surface 47 of the protrusion 45 can be ensured to be a thickness capable of enduring the fluid pressure load. In addition, the axial thickness t4 between the detent hole 65 and the top surface 48 of the protrusion 45 can be ensured to be a thickness capable of enduring the fluid pressure load.

Further, because the angle θ made by the detent hole 65 and the residual hole 68, which is the friction stir welding terminating point, at the center of the inlet hole 51 is not less than 45 degrees, as shown in FIG. 3, it is possible to prevent a worker from mistaking the residual hole 68 and the detent hole 65 for each other. That is, when the inner diameter of the residual hole 68 and the distance between the residual hole 68 and the inlet hole 51 are close to the inner diameter of the detent hole 65 and the distance between the detent hole 65 and the inlet hole 51, respectively, the detent portion 66 of the plug 56, which should be fitted into the detent hole 65, may be mistakenly fitted into the residual hole 68, as shown by the two-dot chain lines in FIG. 1. If such occurs, the piping 55 would be deformed to a considerable extent to allow the worker to recognize the installation error. Depending on the length thereof, the piping 55 will become stiff if the detent portion 66 is mistakenly fitted into the residual hole 68, which makes it possible to prevent the occurrence of an installation error itself. Therefore, it is possible to prevent the piping 55 from being mistakenly installed while being deformed.

Further, because the inlet hole 51 of the bottom cover member 92 is displaced from the center of the bottom cover member 92, the other holes, i.e. the detent hole 65 and the residual hole 68, can be favorably arranged, particularly, when these holes are disposed within the boundaries of the protrusion 45 in order to ensure the distances t1 to t4 of the detent hole 65 and the residual hole 68 with respect to the fluid chamber 50 in the bore 30 and to ensure the thread engagement length L for the union bolt 57.

[Second Embodiment]

Figure 6:
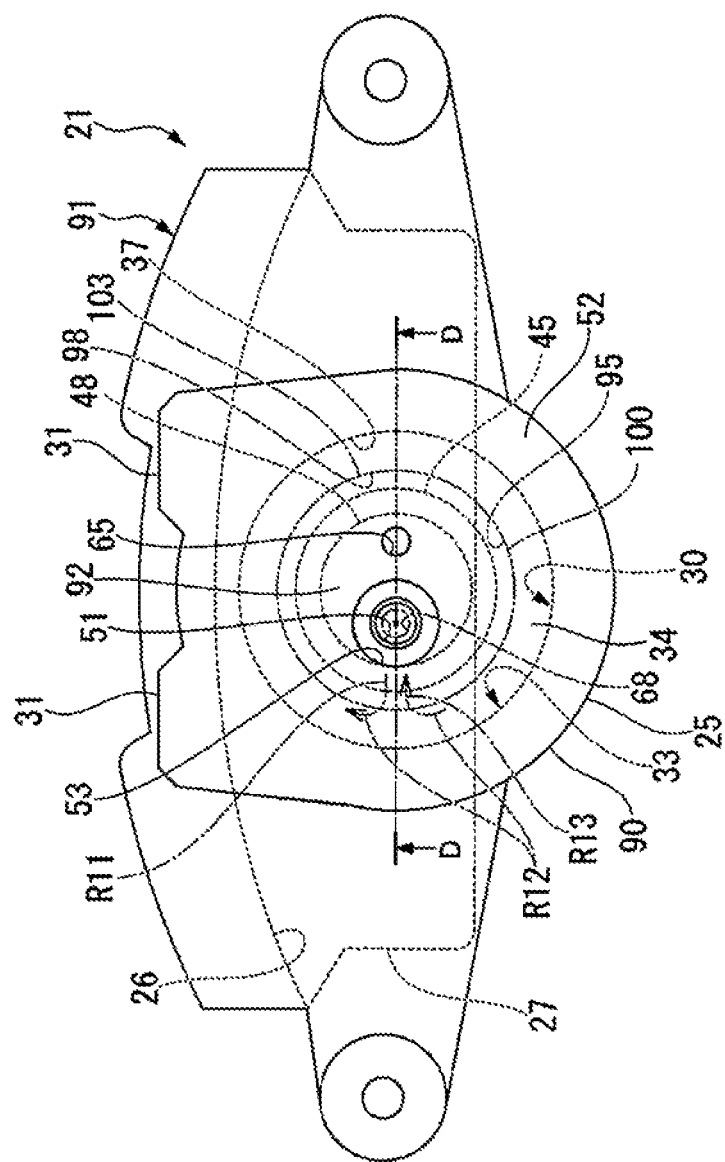
FIG. 6 is a rear view of a caliper body of a disk brake according to a second embodiment of the present invention.
Figure 7:
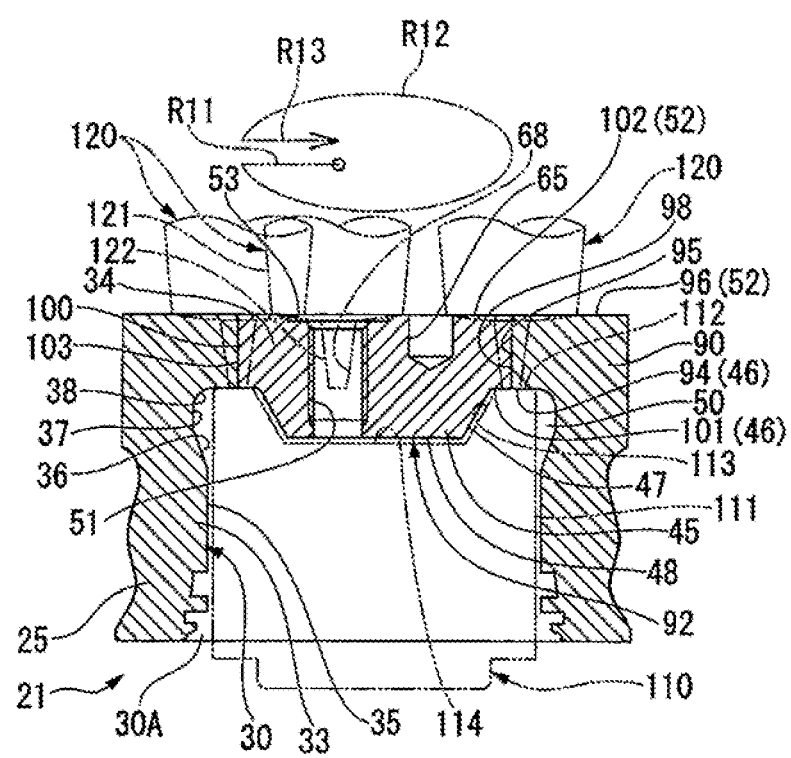
FIG. 7 is a sectional view taken along the line D-D in FIG. 6, showing the caliper body of the disk brake according to the second embodiment.

Next, a second embodiment of the present invention will be explained mainly with reference to FIGS. 6 and 7 and mainly with regard to points in which the second embodiment differs from the first embodiment. It should be noted that members or portions common to the first and second embodiments will be named the same names and denoted by the same reference marks.

In the second embodiment, the inlet hole 51 is formed at the terminating point of friction stir welding. The inner diameter of the inlet hole 51 is larger than that of the residual hole 68 (shown in FIG. 7) formed at the friction stir welding terminating point, and the inlet hole 51 extends through the bottom 34. Therefore, the residual hole 68, which is temporarily formed at the friction stir welding terminating point to extend from the outer surface 52 to a halfway position, is removed when the inlet hole 51 is formed by machining Consequently, the residual hole 68 is not left in the caliper body 21 completed as a finished product.

The residual hole 68 temporarily formed by friction stir welding is disposed on an imaginary line perpendicularly intersecting an imaginary line connecting the center of the bore 30 and the center of the disk 12, being displaced from the center of the bore 30 toward one side in the disk rotational direction. The detent hole 65 is formed on an imaginary line perpendicularly intersecting the imaginary line connecting the center of the bore 30 and the center of the disk 12 in the same way as the residual hole 68, being displaced from the center of the bore 30 toward the other side (remote from the residual hole 68) in the disk rotational direction.

Then, an inlet hole 51 that is one size larger overall than the residual hole 68 is formed, with the center thereof coincident with the center of the residual hole 68, so as to remove the residual hole 68. As a result, the inlet hole 51 is formed on an imaginary line perpendicularly intersecting the imaginary line connecting the center of the bore 30 and the center of the disk 12, being displaced from the center of the bore 30 toward one side (remote from the detent hole 65) in the disk rotational direction. It should be noted that, as seen along the disk axial direction, the detent hole 65 and the inlet hole 51 are each entirely disposed within the boundaries of the protrusion 45, more specifically, within the boundaries of the top surface 48 of the protrusion 45.

In the second embodiment, the above-described friction stir welding step is carried out as follows. The distal shaft portion 122 of the welding tool 120 rotating at high speed is moved from a position where the residual hole 68, i.e. the inlet hole 51, is to be formed, as a starting point, in a direction away from the center of the bore 30 along a radial route R11 in the radial direction of the bore 30 opposite to the direction in which the detent hole 65 is to be formed with respect to the center of the bore 30. When reaching a welding border between the opening peripheral edge 98 of the cylinder constituting part 90 and the outer peripheral edge 103 of the bottom cover member 92, the distal shaft portion 122 of the welding tool 120 is switched at the welding border as a switching point to move one round along a circumferential route R12 in the circumferential direction of the bore 30. When returning to the switching point after moving one round, the distal shaft portion 122 is moved toward the center of the bore 30 along a radial route R13 in the radial direction of the bore 30. When returning to the starting point, the distal shaft portion 122 is pulled out of the caliper body 21.

Thereafter, the inlet hole 51 is formed at the position of the residual hole 68 during the inlet and other hole drilling step carried out to form the inlet hole 51, the spot facing 53 and the detent hole 65 in the bottom 34 of the bore 30 by drilling from the outside. In this case also, the inlet hole 51 is provided to extend through between the top surface 48, which is one side of the bottom cover member 92 where the protrusion 45 is formed, and the outer-surface constituting surface 102, which is the other side of the bottom cover member 92.

According to the above-described second embodiment, the inlet hole 51 is formed at the position of the residual hole 68, which is the terminating point of friction stir welding. Therefore, it is possible to reduce the number of holes formed in the bottom 34 of the bore 30. Accordingly, it is possible to increase the degree of freedom for layout of holes necessary to form within the limited area of the bottom 34, i.e. the inlet hole 51 and the detent hole 65. In addition, it is possible to further improve durability against the load of brake fluid pressure during braking.

Further, because the inlet hole 51 is formed at the position of the residual hole 68, the machining margin for the inlet hole 51 is minimized, and the machining time can be reduced.

[Third Embodiment]

Next, a third embodiment of the present invention will be explained mainly with reference to FIG. 8 and mainly with regard to points in which the third embodiment differs from the second embodiment. It should be noted that members or portions common to the second and third embodiments will be named the same names and denoted by the same reference marks.

Figure 8:
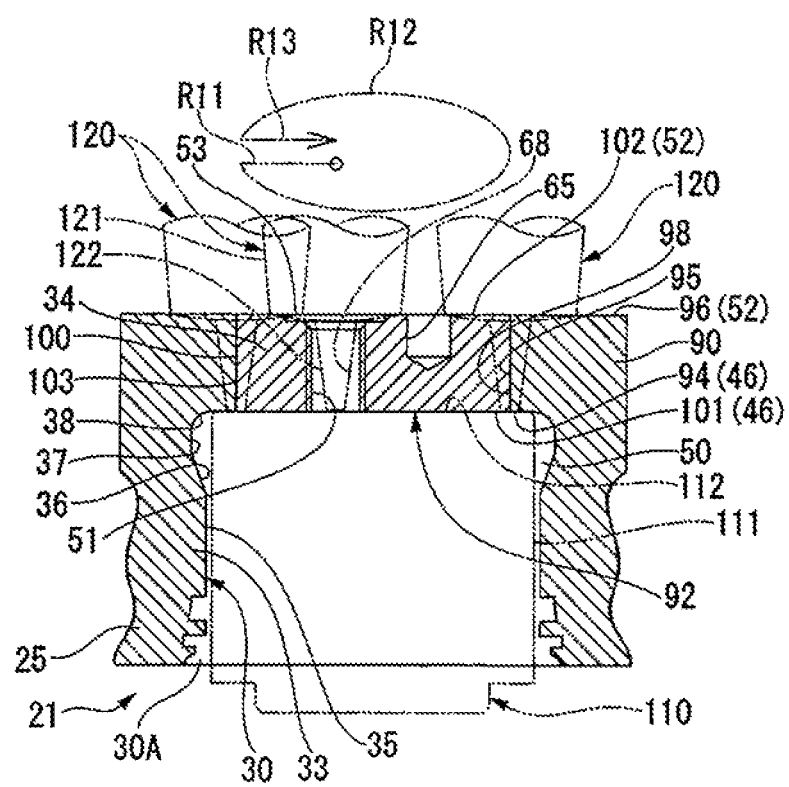
FIG. 8 is a sectional view of a caliper body of a disk brake according to a third embodiment of the present invention.

In the third embodiment, as shown in FIG. 8, the bottom 34, i.e. the bottom cover member 92, is not provided with the protrusion 45 of the second embodiment. In other words, the third embodiment uses a bottom cover member 92 in the shape of a flat plate with a predetermined fixed thickness. In the above-described second embodiment, the residual hole 68 extending in the axial direction of the bore 30 is removed by the inlet hole 51 extending through the bottom 34 in the axial direction of the bore 30. Therefore, there will be no problem even if the residual hole 68 extends through the bottom 34, or the distance between the deepest part of the residual hole 68 and the fluid chamber 50 in the bore 30 is a dimension with which the bottom 34 cannot endure the fluid pressure load. For this reason, the present invention is applicable to a structure in which the bottom 34, i.e. the bottom cover member 92, has no protrusion 45 as shown in FIG. 8, that is, in which the bottom cover member 92 is in the shape of a flat plate having a predetermined fixed thickness, provided that it is possible to ensure the required thread engagement length for the inlet hole 51 and the required distance between the detent hole 65 and the fluid chamber 50. The third embodiment uses a core jig 110 that is not provided with the conical inner surface 113 and the flat bottom surface 114, which are required in the second embodiment.

[Fourth Embodiment]

Figure 9:
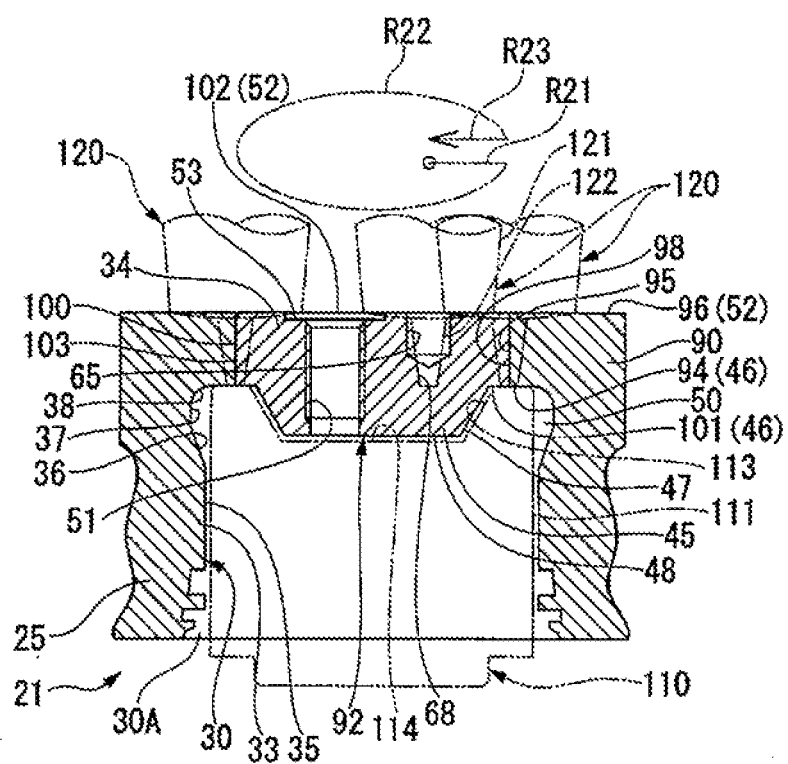
FIG. 9 is a sectional view of a caliper body of a disk brake according to a fourth embodiment of the present invention.

Next, a fourth embodiment of the present invention will be explained mainly with reference to FIG. 9 and mainly with regard to points in which the fourth embodiment differs from the first embodiment. It should be noted that members or portions common to the first and fourth embodiments will be named the same names and denoted by the same reference marks.

In the fourth embodiment, the detent hole 65 is formed at the terminating point of friction stir welding. The inner diameter of the detent hole 65 is larger than that of the residual hole 68 formed at the friction stir welding terminating point. The residual hole 68, which is temporarily formed at the friction stir welding terminating point to extend from the outer surface 52 to a halfway position, has a part of its outer surface 52-side portion removed when the detent hole 65 is formed by machining Thus, a part of the outer surface 52-side portion of the residual hole 68 has been removed from the caliper body 21 completed as a finished product.

The residual hole 68 temporarily formed by friction stir welding is disposed on an imaginary line perpendicularly intersecting an imaginary line connecting the center of the bore 30 and the center of the disk 12, being displaced from the center of the bore 30 toward one side in the disk rotational direction. The inlet hole 51 is formed on an imaginary line perpendicularly intersecting the imaginary line connecting the center of the bore 30 and the center of the disk 12 in the same way as the residual hole 68, being displaced from the center of the bore 30 toward the other side (remote from the residual hole 68) in the disk rotational direction.

Then, a detent hole 65 that is one size larger in diameter than the residual hole 68 is formed, with the center thereof coincident with the center of the residual hole 68, in such a manner as to remove an outer surface 52-side part of the residual hole 68. As a result, the detent hole 65 is formed on an imaginary line perpendicularly intersecting the imaginary line connecting the center of the bore 30 and the center of the disk 12, being displaced from the center of the bore 30 toward one side (remote from the inlet hole 51) in the disk rotational direction. It should be noted that, as seen along the disk axial direction, the detent hole 65 and the inlet hole 51 are each entirely disposed within the boundaries of the protrusion 45, more specifically, within the boundaries of the top surface 48 of the protrusion 45.

In the fourth embodiment, the above-described friction stir welding step is carried out as follows. The distal shaft portion 122 of the welding tool 120 rotating at high speed is moved from a position where the residual hole 68, i.e. the detent hole 65, is to be formed, as a starting point, in a direction away from the center of the bore 30 along a radial route R21 in the radial direction of the bore 30 opposite to the direction in which the inlet hole 51 is to be formed with respect to the center of the bore 30. When reaching a welding border between the opening peripheral edge 98 of the cylinder constituting part 90 and the outer peripheral edge 103 of the bottom cover member 92, the distal shaft portion 122 of the welding tool 120 is switched at the welding border as a switching point to move one round along a circumferential route R22 in the circumferential direction of the bore 30. When returning to the switching point after moving one round, the distal shaft portion 122 is moved toward the center of the bore 30 along a radial route R23 in the radial direction of the bore 30. When returning to the starting point, the distal shaft portion 122 is pulled out of the caliper body 21.

Thereafter, the detent hole 65 is formed at the position of the residual hole 68 during the inlet and other hole drilling step carried out to form the inlet hole 51, the spot facing 53 and the detent hole 65 in the bottom 34 of the bore 30 by drilling from the outside.

According to the above-described fourth embodiment, the detent hole 65 is formed at the position of the residual hole 68, which the terminating point of friction stir welding. Therefore, it is possible to reduce the number of holes formed in the bottom 34 of the bore 30. Accordingly, it is possible to increase the degree of freedom for layout of holes necessary to form within the limited area of the bottom 34, i.e. the inlet hole 51 and the detent hole 65. In addition, it is possible to further improve durability against the load of brake fluid pressure during braking.

Further, because the detent hole 65 is formed at the position of the residual hole 68, the machining margin for the detent hole 65 is minimized, and the machining time can be reduced.

[Fifth Embodiment]

Next, a fifth embodiment of the present invention will be explained mainly with reference to FIGS. 10 and 11 and mainly with regard to points in which the fifth embodiment differs from the third embodiment. It should be noted that members or portions common to the third and fifth embodiments will be named the same names and denoted by the same reference marks.

Figure 10:
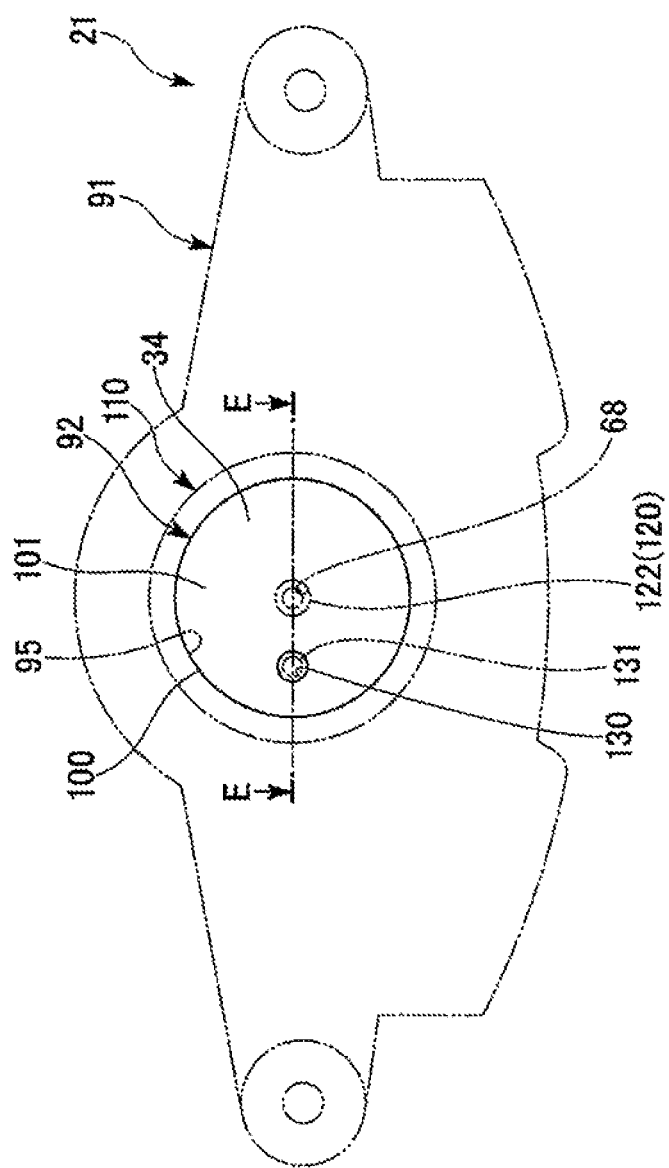
FIG. 10 is a front view of a caliper body of a disk brake according to a fifth embodiment of the present invention, mainly showing a bottom cover member.
Figure 11:
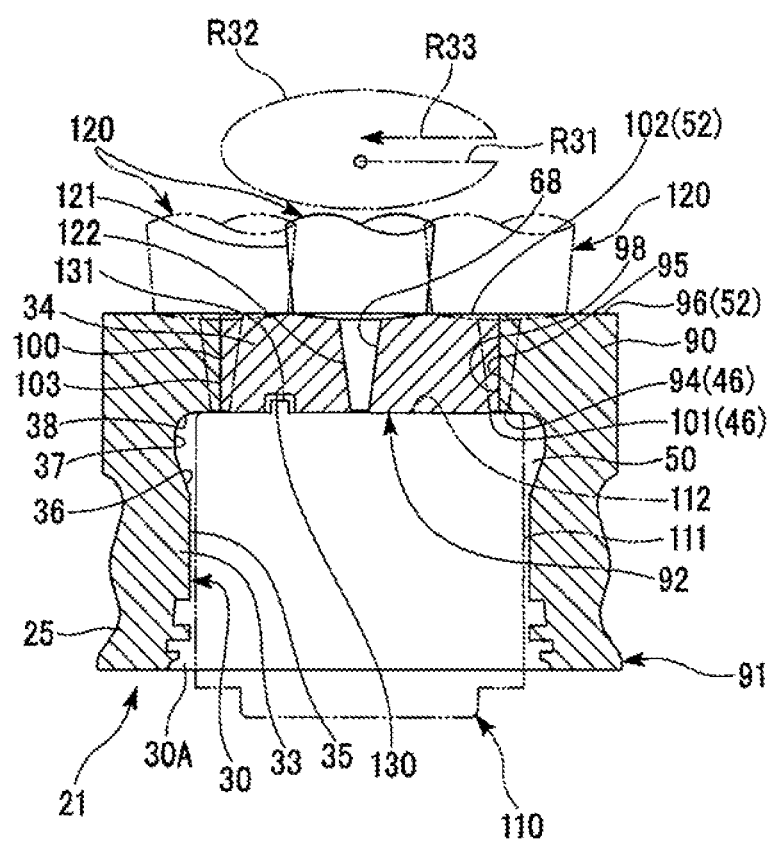
FIG. 11 is a sectional view taken along the line E-E in FIG. 10, showing the caliper body of the disk brake according to the fifth embodiment.

In the fifth embodiment, as shown in FIGS. 10 and 11, the bottom 34, i.e. the bottom cover member 92, is not provided with the protrusion 45 in the same way as the third embodiment. In other words, the fifth embodiment uses a bottom cover member 92 in the shape of a flat plate with a predetermined fixed thickness. In the fifth embodiment, as shown in FIG. 11, the bottom constituting surface 101 of the bottom cover member 92 constituting the bottom surface 46 of the bottom 34 is provided with an engagement recess (engagement portion) 130 recessed in the axial direction of the bottom cover member 92. The engagement recess 130 is formed at only one position displaced from the center of the bottom cover member 92. The engagement recess 130 has a bottom surface that is a flat surface parallel to the bottom constituting surface 101 and a side surface that is a circular cylindrical surface perpendicularly intersecting the bottom constituting surface 101. The engagement recess 130 is drilled by using an end mill or the like. The whole axial one side of the bottom cover member 92, except the engagement recess 130, is the flat bottom constituting surface 101. The engagement recess 130 is left on the bottom surface 46 of the bottom 34 of the caliper body 21 after the friction stir welding step. The engagement recess 130 is located in the bore 30.

The fifth embodiment uses a core jig 110 that is not provided with the conical inner surface 113 and the bottom surface 114 in the same way as the third embodiment. The core jig 110 has an engagement projection 131 formed at only one position on the reference surface 112 at one axial side thereof that abuts against the bottom constituting surface 101 of the bottom cover member 92. The engagement projection 131 is displaced from the center of the core jig 110 and projects in the axial direction so as to engage with the engagement recess 130. The engagement projection 131 is in the shape of a circular column extending perpendicular to the reference surface 112. The projecting height of the engagement projection 131 is less than the depth of the engagement recess 130. The whole axial one side of the core jig 110, except the engagement projection 131, is the flat reference surface 112.

In the fifth embodiment, the bottom cover member 92 is positioned relative to the core jig 110 and the caliper body main unit 91, which have been positioned and locked relative to each other, as follows. (1) The fitting cylindrical surface 100 of the bottom cover member 92 is fitted to the fitting cylindrical surface 95 of the caliper body main unit 91. (2) The engagement recess 130 of the bottom cover member 92 is engaged with the engagement projection 131 of the core jig 110. (3) The bottom constituting surface 101 of the bottom cover member 92 abuts against the reference surface 112 of the core jig 110.

The bottom cover member 92 disposed in this way has its circumferential position determined relative to the caliper body main unit 91 and is latched in the circumferential position by engagement of the engagement recess 130 with the engagement projection 131 of the core jig 110. Thus, the bottom cover member 92 is restrained from rotating relative to the caliper body main unit 91. In other words, the bottom cover member 92 has the engagement recess 130 located in the bore 30 to determine its circumferential position relative to the caliper body 21 and to latch the bottom cover member 92 in the circumferential position. It should be noted that, in the above-described state, the phase of the core jig 110 relative to the caliper body main unit 91 is determined so that, as shown in FIG. 10, an imaginary line connecting the center of the bottom cover member 92 (center of the bore 30) and the center of the engagement recess 130 intersects substantially perpendicularly to an imaginary line connecting the center of the bottom cover member 92 and the center of the disk 12. It should be noted that, if the engagement recess 130 of the bottom cover member 92 is not engaged with the engagement projection 131 of the core jig 110, there will be a step between the outer-surface constituting surface 102 of the bottom cover member 92 and the outer-surface constituting surface 96 of the caliper body main unit 91. This allows the worker to visually notice an error in installation of the bottom cover member 92.

In the friction stir welding step, the distal shaft portion 122 of the welding tool 120 rotating at high speed is inserted axially into the bottom cover member 92 at the center thereof, for example, as a starting point, and moved from the starting point along a radial route R31 in the radial direction of the bore 30 opposite to the direction in which the engagement recess 130 exists. When reaching the welding border between the opening peripheral edge 98 of the cylinder constituting part 90 and the outer peripheral edge 103 of the bottom cover member 92, the distal shaft portion 122 is switched at the welding border as a switching point to move one round along a circumferential route R32 in the circumferential direction of the bore 30. When reaching the switching point again, the distal shaft portion 122 is moved toward the center of the bore 30 along a radial route R33 in the radial direction of the bore 30. When eventually returning to the starting point, the distal shaft portion 122 is pulled out axially from the caliper body 21.

According to the above-described fifth embodiment, the bottom cover member 92 has the engagement recess 130 located in the bore 30 to determine a circumferential position of the bottom cover member 92 relative to the caliper body main unit 91 and to latch the bottom cover member 92 in the circumferential position. In the friction stir welding step, the engagement recess 130 is engaged with the engagement projection 131 of the core jig 110 to prevent the bottom cover member 92 from rotating relative to the caliper body main unit 91 when the bottom cover member 92 receives rotational force from the welding tool 120 rotating at high speed. That is, the bottom cover member 92 is prevented from rotating together with the welding tool 120. Accordingly, the speed of rotation of the welding tool 120 relative to the bottom cover member 92 will not reduce. Consequently, it is possible to suppress the occurrence of surface and interior defects, which are likely to occur during friction stir welding when the welding tool 120 rotates at low speed.

In the friction stir welding step, if the center of the bottom cover member 92 is used as the starting point of friction stir welding, as in the case of the above, in particular, the bottom cover member 92 is likely to rotate. Therefore, the engagement of the engagement recess 130 with the engagement projection 131 of the core jig 110 is highly effective in preventing the rotation of the bottom cover member 92.

Further, in the friction stir welding step, the distal shaft portion 122 of the welding tool 120 is moved from the center of the bottom cover member 92 along the radial route R31 opposite to the direction in which the engagement recess 130 exists, and moved one round along the circumferential route R32, and further moved to the center of the bottom cover member 92 along the radial route R33 in which the distal shaft portion 122 moves opposite to the direction of the radial route R31. Therefore, it is possible to suppress the influence exerted on the mechanical strength by the nearness of the friction-stir-welded part to the engagement recess 130.

[Sixth Embodiment]

Figure 12:
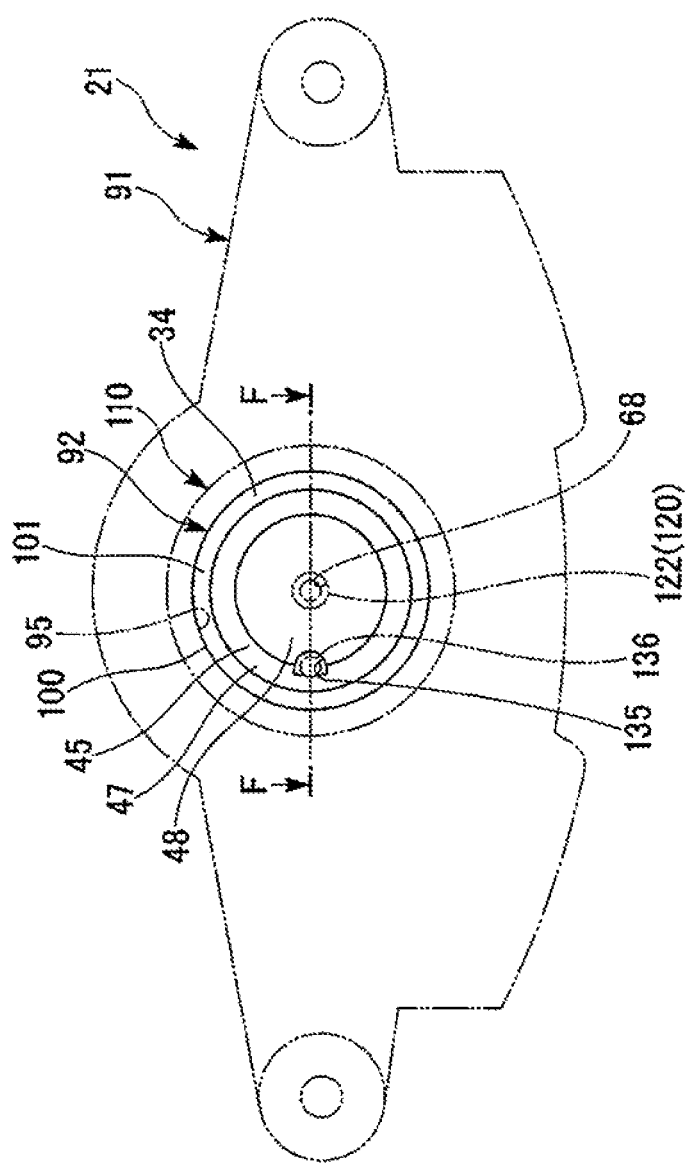
FIG. 12 is a front view of a caliper body of a disk brake according to a sixth embodiment of the present invention, mainly showing a bottom cover member.

Next, a sixth embodiment of the present invention will be explained mainly with reference to FIGS. 12 and 13 and mainly with regard to points in which the sixth embodiment differs from the first embodiment. It should be noted that members or portions common to the first and sixth embodiments will be named the same names and denoted by the same reference marks.

In the first embodiment shown in FIGS. 1 to 5, the protrusion 45 is provided on the bottom 34, i.e. the bottom cover member 92, for the purpose of ensuring the required internal thread length for the inlet hole 51 in the bottom 34 and for the purpose of allowing the axial thickness t2 of the bottom 34 to be ensured even if the detent hole 65 and the residual hole 68 are formed. In the sixth embodiment also, the protrusion 45 is provided on the bottom 34, i.e. the bottom cover member 92, as shown in FIGS. 12 and 13, so as to be located in the bore 30 for the same purposes as the above.

Figure 13:
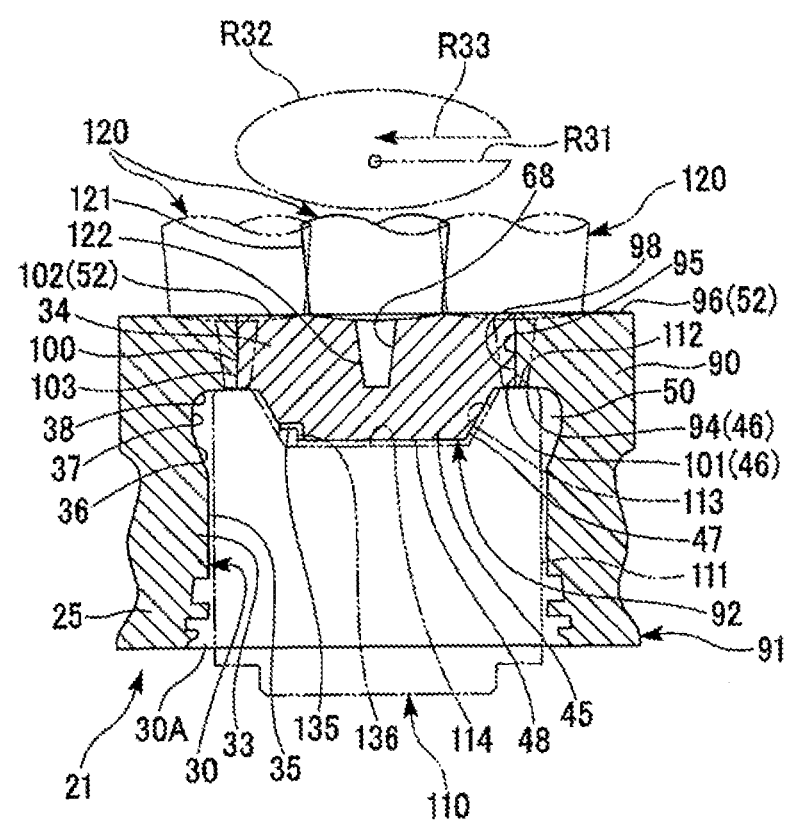
FIG. 13 is a sectional view taken along the line F-F in FIG. 12, showing the caliper body of the disk brake according to the sixth embodiment.

As shown in FIG. 13, the top surface 48 at the distal end of the protrusion 45 is provided with an engagement recess (engagement portion) 135 recessed in the axial direction of the bottom cover member 92. The engagement recess 135 is formed at only one position displaced from the center of the bottom cover member 92. The engagement recess 135 is formed at the radially outer edge of the top surface 48, extending into a part of the distal end of the tapered outer peripheral surface 47. Accordingly, the engagement recess 135 partially extends into the tapered outer peripheral surface 47. The engagement recess 135 has a circular cylindrical side surface perpendicularly intersecting the top surface 48. The bottom surface of the engagement recess 135 is a flat surface parallel to the top surface 48. The engagement recess 135 is drilled by using an end mill or the like. The engagement recess 135 is left on the bottom 34 of the caliper body 21 after the friction stir welding step. The engagement recess 135 is located in the bore 30.

In the sixth embodiment, the core jig 110 has an axially projecting engagement projection 136 formed at only one position on the flat bottom surface 114 displaced from the center of the core jig 110 so as to fit into the engagement recess 135. The engagement projection 136 is formed at a radially outer edge of the flat bottom surface 114, extending over a part of the proximal end of the conical inner surface 113. The engagement projection 136 has a circular columnar configuration perpendicularly intersecting the flat bottom surface 114.

In the sixth embodiment, the bottom cover member 92 is positioned relative to the core jig 110 and the caliper body main unit 91, which have been positioned and locked relative to each other, as follows. (1) The fitting cylindrical surface 100 of the bottom cover member 92 is fitted to the fitting cylindrical surface 95 of the caliper body main unit 91. (2) The tapered outer peripheral surface 47 of the protrusion 45 of the bottom cover member 92 faces the conical inner surface 113 of the core jig 110. (3) The top surface 48 of the protrusion 45 of the bottom cover member 92 faces the flat bottom surface 114 of the core jig 110. (4) The engagement recess 135 of the bottom cover member 92 engages with the engagement projection 136 of the core jig 110. (5) The bottom constituting surface 101 of the bottom cover member 92 abuts against the reference surface 112 of the core jig 110.

The bottom cover member 92 disposed in this way has its circumferential position determined relative to the caliper body main unit 91 and is latched in the circumferential position by engagement of the engagement recess 135 with the engagement projection 136 of the core jig 110. Thus, the bottom cover member 92 is restrained from rotating relative to the caliper body main unit 91. In other words, the bottom cover member 92 has the engagement recess 135 formed at one position on the distal end of the protrusion 45 so as to be located in the bore 30 to determine a circumferential position of the bottom cover member 92 relative to the caliper body 21 and to latch the bottom cover member 92 in the circumferential position. It should be noted that, in the above-described state, the phase of the core jig 110 relative to the caliper body main unit 91 is determined so that, as shown in FIG. 12, an imaginary line connecting the center of the bottom cover member 92 (center of the bore 30) and the center of the engagement recess 135 intersects substantially perpendicularly to an imaginary line connecting the center of the bottom cover member 92 and the center of the disk 12. In this case also, if the engagement recess 135 of the bottom cover member 92 is not engaged with the engagement projection 136 of the core jig 110, there will be an unnecessary step between the outer-surface constituting surface 102 of the bottom cover member 92 and the outer-surface constituting surface 96 of the caliper body main unit 91.

In the friction stir welding step, the distal shaft portion 122 of the welding tool 120 rotating at high speed is inserted axially into the bottom cover member 92 at the center thereof, for example, as a starting point, and moved from the starting point along a radial route R31 in the radial direction of the bore 30 opposite to the direction in which the engagement recess 135 exists. When reaching the welding border between the opening peripheral edge 98 of the cylinder constituting part 90 and the outer peripheral edge 103 of the bottom cover member 92, the distal shaft portion 122 is switched at the welding border as a switching point to move one round along a circumferential route R32 in the circumferential direction of the bore 30. When reaching the switching point again, the distal shaft portion 122 is moved toward the center of the bore 30 along a radial route R33 in the radial direction of the bore 30. When eventually returning to the starting point, the distal shaft portion 122 is pulled out axially from the caliper body 21.

According to the above-described sixth embodiment, the bottom cover member 92 has the engagement recess 135 located in the bore 30 to determine a circumferential position of the bottom cover member 92 relative to the caliper body main unit 91 and to latch the bottom cover member 92 in the circumferential position. In the friction stir welding step, the engagement recess 135 is engaged with the engagement projection 136 of the core jig 110 to prevent the bottom cover member 92 from rotating relative to the caliper body main unit 91 when the bottom cover member 92 receives rotational force from the welding tool 120 rotating at high speed. Accordingly, the speed of rotation of the welding tool 120 relative to the bottom cover member 92 will not reduce. Consequently, it is possible to suppress the occurrence of surface and interior defects on the caliper body 21, which are likely to occur during friction stir welding when the welding tool 120 rotates at low speed.

In the friction stir welding step, if the center of the bottom cover member 92 is used as the starting point of friction stir welding, as in the case of the above, in particular, the bottom cover member 92 is likely to rotate. Therefore, the engagement of the engagement recess 135 with the engagement projection 136 of the core jig 110 is highly effective in preventing the rotation of the bottom cover member 92.

Further, because the engagement recess 135 is formed on the distal end of the protrusion 45 of the bottom cover member 92, it is possible to suppress the influence of providing the engagement recess 135. That is, the minimum wall thickness will not be reduced, so that it is possible to improve durability against the load of brake fluid pressure during braking.

Further, because the engagement recess 135 is formed at only one position on the distal end of the protrusion 45 of the bottom cover member 92, it is possible to ensure the required wall thickness and to increase the degree of freedom in determining the layout of the inlet hole 51, the detent hole 65 and the residual hole 68, as stated in the first embodiment.

Further, in the friction stir welding step, the distal shaft portion 122 of the welding tool 120 is moved from the center of the bottom cover member 92 along the radial route R31 opposite to the direction in which the engagement recess 135 exists, and moved one round along the circumferential route R32, and further moved along the radial route R33 in which the distal shaft portion 122 moves opposite to the direction of the radial route R31. Therefore, it is possible to suppress the influence exerted on the mechanical strength by the nearness of the friction-stir-welded part to the engagement recess 135.

[Seventh Embodiment]

Figure 14:
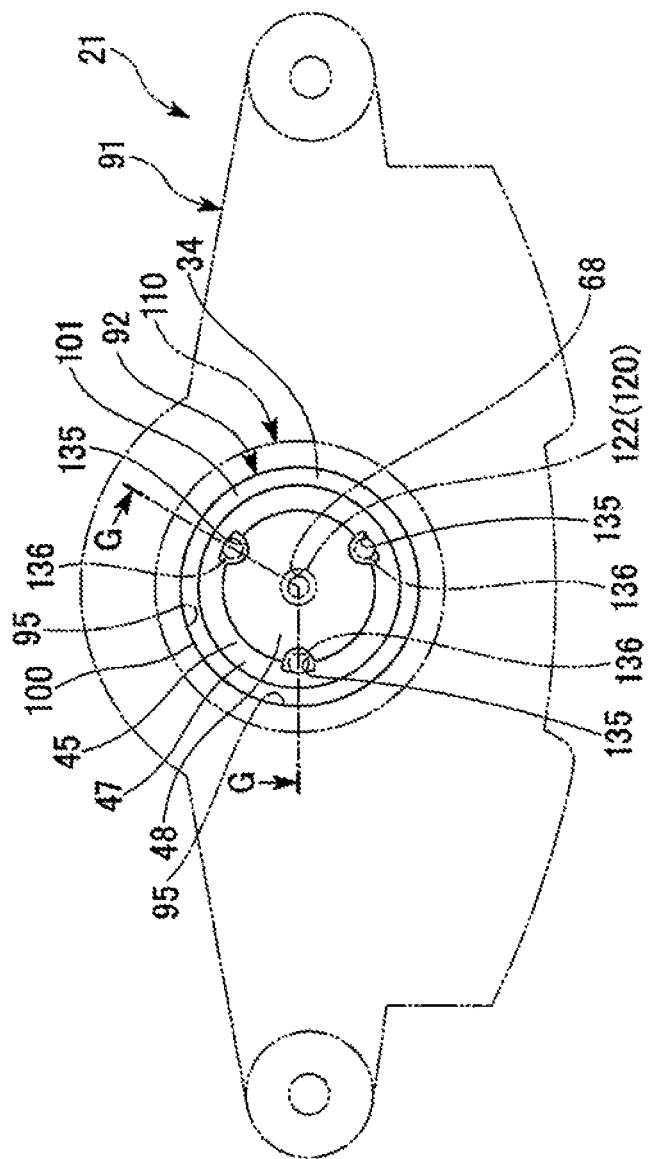
FIG. 14 is a front view of a caliper body of a disk brake according to a seventh embodiment of the present invention, mainly showing a bottom cover member.
Figure 15:
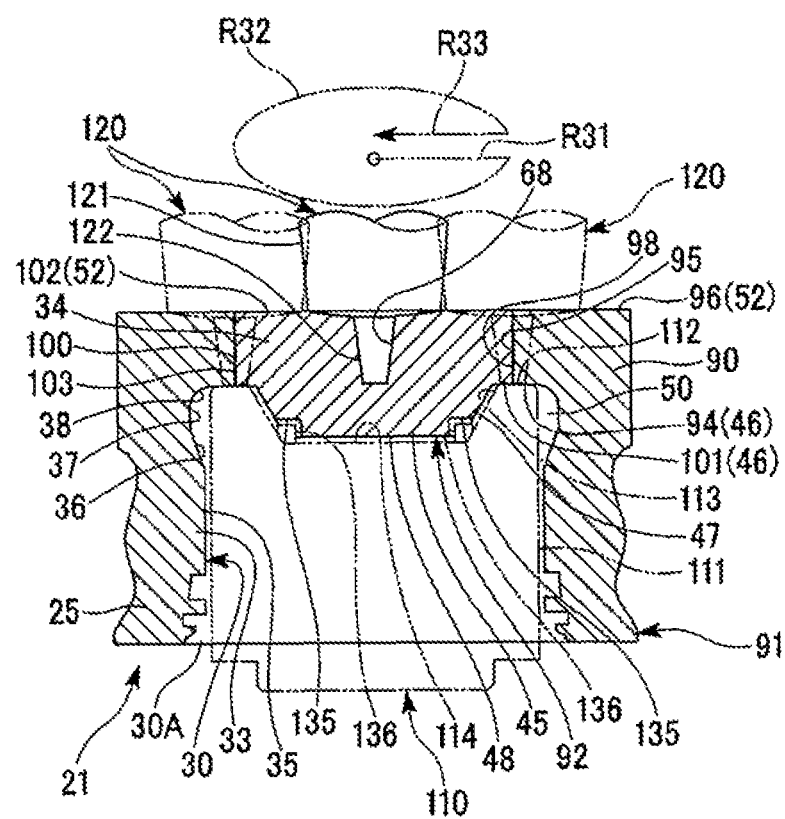
FIG. 15 is a sectional view taken along the line G-G in FIG. 14, showing the caliper body of the disk brake according to the seventh embodiment.

Next, a seventh embodiment of the present invention will be explained mainly with reference to FIGS. 14 and 15 and mainly with regard to points in which the seventh embodiment differs from the sixth embodiment. It should be noted that members or portions common to the sixth and seventh embodiments will be named the same names and denoted by the same reference marks.

In the seventh embodiment, the top surface 48 of the protrusion 45 of the bottom 34, i.e. the bottom cover member 92, has a plurality of engagement recesses 135 similar to the engagement recess 135 in the sixth embodiment, which are formed at a plurality of circumferentially equally spaced positions, respectively. More specifically, three engagement recesses 135 are formed at three positions, respectively, at a pitch of 120 degrees. The engagement recesses 135 are formed at respective positions at equal distances from the center of the bore 30, i.e. from the center of the bottom cover member 92.

Further, in the seventh embodiment, the flat bottom surface 114 of the core jig 110 has a plurality of engagement projections 136 similar to the engagement projection 136 in the sixth embodiment, which are formed at a plurality of circumferentially equally spaced positions so that the engagement projections 136 fit into the engagement recesses 135, respectively. More specifically, the engagement projections 136 are formed at three positions, respectively, at a pitch of 120 degrees. The engagement recesses 135 are formed at respective positions at equal distances from the center of the core jig 110.

In the seventh embodiment, the bottom cover member 92 is positioned relative to the core jig 110 and the caliper body main unit 91, which have been positioned and locked relative to each other, as follows. (1) The fitting cylindrical surface 100 of the bottom cover member 92 is fitted to the fitting cylindrical surface 95 of the caliper body main unit 91. (2) The tapered outer peripheral surface 47 of the protrusion 45 of the bottom cover member 92 faces the conical inner surface 113 of the core jig 110. (3) The top surface 48 of the protrusion 45 of the bottom cover member 92 faces the flat bottom surface 114 of the core jig 110. (4) The three engagement recesses 135 of the bottom cover member 92 engage with the three engagement projections 136 of the core jig 110 in one-to-one correspondence. (5) The bottom constituting surface 101 of the bottom cover member 92 abuts against the reference surface 112 of the core jig 110.

The bottom cover member 92 disposed in this way has its circumferential position determined relative to the caliper body main unit 91 and is latched in the circumferential position by engagement of the three engagement recesses 135 with the three engagement projections 136 of the core jig 110. Thus, the bottom cover member 92 is restrained from rotating relative to the caliper body main unit 91. In other words, the bottom cover member 92 has the engagement recesses 135 formed at a plurality of positions at equal pitches so as to be located on the protrusion 45 in the bore 30 to determine a circumferential position of the bottom cover member 92 relative to the caliper body 21 and to latch the bottom cover member 92 in the circumferential position. It should be noted that, in the above-described state, the phase of the core jig 110 relative to the caliper body main unit 91 is determined so that, as shown in FIG. 14, an imaginary line connecting the center of the bottom cover member 92 (center of the bore 30) and the center of one engagement recess 135 intersects substantially perpendicularly to an imaginary line connecting the center of the bottom cover member 92 and the center of the disk 12. In this case also, if the engagement recesses 135 of the bottom cover member 92 are not engaged with the engagement projections 136 of the core jig 110, there will be an unnecessary step between the outer-surface constituting surface 102 of the bottom cover member 92 and the outer-surface constituting surface 96 of the caliper body main unit 91.

In the friction stir welding step, the distal shaft portion 122 of the welding tool 120 rotating at high speed is inserted axially into the bottom cover member 92 at the center thereof, for example, as a starting point, and moved from the starting point along a radial route R31 in the radial direction of the bore 30 opposite to the direction in which the above-described one engagement recess 135 exists. When reaching the welding border between the opening peripheral edge 98 of the cylinder constituting part 90 and the outer peripheral edge 103 of the bottom cover member 92, the distal shaft portion 122 is switched at the welding border as a switching point to move one round along a circumferential route R32 in the circumferential direction of the bore 30. When reaching the switching point again, the distal shaft portion 122 is moved toward the center of the bore 30 along a radial route R33 in the radial direction of the bore 30. When eventually returning to the starting point, the distal shaft portion 122 is pulled out axially from the caliper body 21.

According to the above-described seventh embodiment, the bottom cover member 92 has a plurality of engagement recesses 135 located on the distal end of the protrusion 45 in the bore 30 to determine a circumferential position of the bottom cover member 92 relative to the caliper body main unit 91 and to latch the bottom cover member 92 in the circumferential position. Therefore, when the bottom cover member 92 receives rotational force from the welding tool 120 rotating at high speed in the friction stir welding step, it is possible to suppress deformation or the like of the engagement recesses 135 due to reaction force from the engagement projections 136 of the core jig 110, and it is possible to surely prevent rotation of the bottom cover member 92 relative to the caliper body main unit 91. Particularly, because the bottom cover member 92 is made of a soft aluminum material, the above-described advantageous effect is remarkable.

Further, because the bottom cover member 92 has a plurality of engagement recesses 135 formed at a plurality of positions at equal pitches to determine a circumferential position of the bottom cover member 92 relative to the caliper body main unit 91 and to latch the bottom cover member 92 in the circumferential position, it becomes easy to set the bottom cover member 92 to the caliper body main unit 91 and to the core jig 110. That is, when the bottom cover member 92 is set, the maximum amount of rotation required to engage the three engagement recesses 135 with the three engagement projections 136 of the core jig 110 in one-to-one correspondence reduces, so that the setting of the bottom cover member 92 is facilitated. Accordingly, the friction stir welding step can be carried out efficiently.

Further, in the friction stir welding step, the distal shaft portion 122 of the welding tool 120 is moved from the center of the bottom cover member 92 along the radial route R31 opposite to the direction in which one engagement recess 135 exists so as to pass through the middle between the other two engagement recesses 135, and moved one round along the circumferential route R32, and further moved along the radial route R33 in which the distal shaft portion 122 moves opposite to the direction of the radial route R31. Therefore, it is possible to suppress the influence exerted on the mechanical strength by the nearness of the friction-stir-welded part to the plurality of engagement recesses 135.

[Eighth Embodiment]

Figure 16:
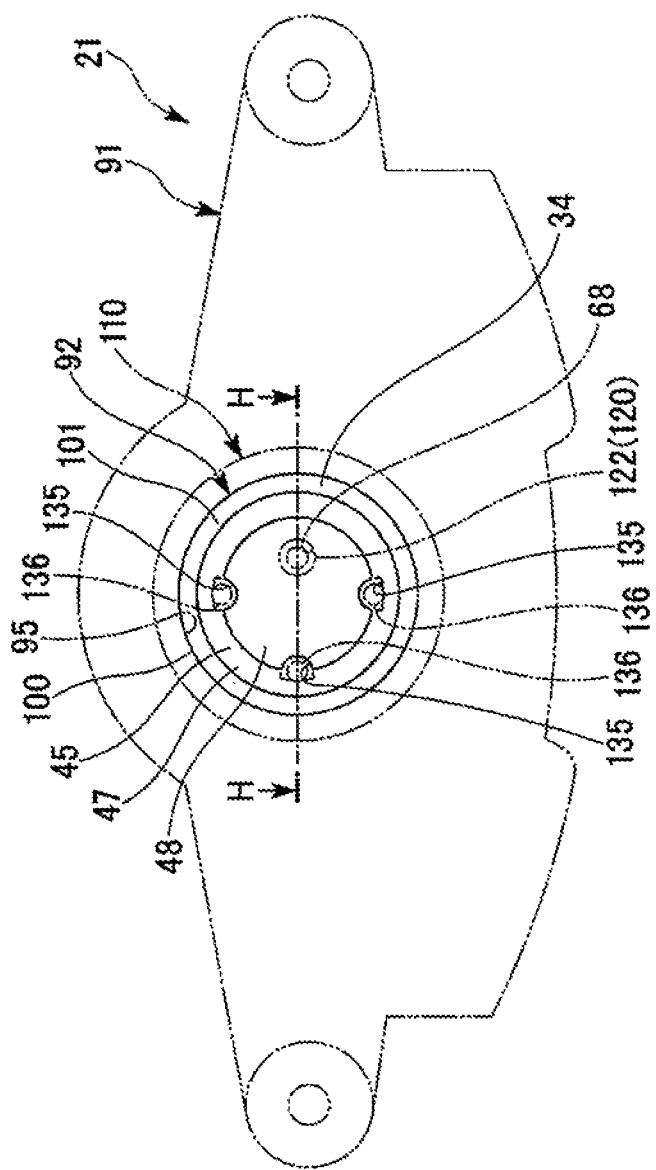
FIG. 16 is a front view of a caliper body of a disk brake according to an eighth embodiment of the present invention, mainly showing a bottom cover member.

Next, an eighth embodiment of the present invention will be explained mainly with reference to FIGS. 16 and 17 and mainly with regard to points in which the eighth embodiment differs from the seventh embodiment. It should be noted that members or portions common to the seventh and eighth embodiments will be named the same names and denoted by the same reference marks.

In the eighth embodiment, the top surface 48 of the protrusion 45 of the bottom 34, i.e. the bottom cover member 92, has a plurality of engagement recesses 135 similar to those in the seventh embodiment, which are formed at a plurality of circumferentially unequally spaced positions, respectively. More specifically, three engagement recesses 135 are formed on the bottom cover member 92 at three positions, respectively, which are circumferentially spaced at unequal pitches of 90 degrees, 90 degrees, and 180 degrees.

Further, in the eighth embodiment, the flat bottom surface 114 of the core jig 110 has a plurality of engagement projections 136 similar to those in the seventh embodiment, which are formed at a plurality of circumferentially unequally spaced positions so that the engagement projections 136 fit into the engagement recesses 135, respectively. More specifically, the engagement projections 136 are formed on the core jig 110 at three positions, respectively, which are circumferentially spaced at unequal pitches of 90 degrees, 90 degrees, and 180 degrees.

In the eighth embodiment, the bottom cover member 92 is positioned relative to the core jig 110 and the caliper body main unit 91, which have been positioned and locked relative to each other, as follows. (1) The fitting cylindrical surface 100 of the bottom cover member 92 is fitted to the fitting cylindrical surface 95 of the caliper body main unit 91. (2) The tapered outer peripheral surface 47 of the protrusion 45 of the bottom cover member 92 faces the conical inner surface 113 of the core jig 110. (3) The top surface 48 of the protrusion 45 of the bottom cover member 92 faces the flat bottom surface 114 of the core jig 110. (4) The three engagement recesses 135 of the bottom cover member 92 engage with the three engagement projection 136 of the core jig 110 in one-to-one correspondence. (5) The bottom constituting surface 101 of the bottom cover member 92 abuts against the reference surface 112 of the core jig 110.

The bottom cover member 92 disposed in this way has its circumferential position determined relative to the caliper body main unit 91 and is latched in the circumferential position by engagement of the three unequally spaced engagement recesses 135 with the three unequally spaced engagement projections 136 of the core jig 110. Thus, the bottom cover member 92 is restrained from rotating relative to the caliper body main unit 91. In other words, the bottom cover member 92 has a plurality of engagement recesses 135 formed at a plurality of positions at unequal pitches so as to be located on the protrusion 45 in the bore 30 to determine a circumferential position of the bottom cover member 92 relative to the caliper body 21 and to latch the bottom cover member 92 in the circumferential position. It should be noted that, in the above-described state, the phase of the core jig 110 relative to the caliper body main unit 91 is determined so that, as shown in FIG. 16, an imaginary line connecting the center of the bottom cover member 92 (center of the bore 30) and the center of the central engagement recess 135 intersects substantially perpendicularly to an imaginary line connecting the center of the bottom cover member 92 and the center of the disk 12, and that an imaginary line connecting the other two engagement recesses 135 substantially coincides with the imaginary line connecting the center of the bottom cover member 92 and the center of the disk 12.

Figure 17:
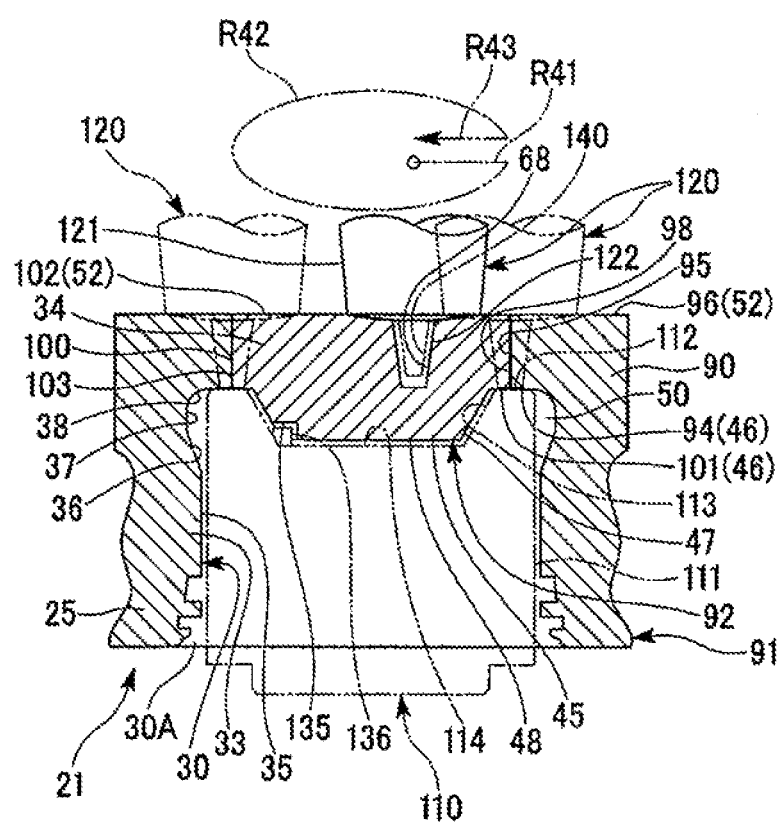
FIG. 17 is a sectional view taken along the line H-H in FIG. 16, showing the caliper body of the disk brake according to the eighth embodiment.

In the eighth embodiment, a position on the bottom cover member 92 that is more remote from the central engagement recess 135 than the center of the bottom cover member 92 is set as a starting point of friction stir welding, and a starting hole 140 shown in FIG. 17 is formed at the starting point in advance of the friction stir welding step. The starting hole 140 is smaller in diameter and shorter in length than the distal shaft portion 122 but allows the distal shaft portion 122 of the welding tool 120 to be inserted thereinto. With the starting hole 140, the time required for the friction stir welding step is shortened.

That is, in the friction stir welding step, the distal shaft portion 122 of the welding tool 120 rotating at high speed is moved axially and inserted into the starting hole 140 provided at the above-described starting point. Then, the distal shaft portion 122 is moved from the position of the starting hole 140 along a radial route R41 in the radial direction of the bore 30 opposite to the direction in which the central engagement recess 135 exists. When reaching the welding border between the opening peripheral edge 98 of the cylinder constituting part 90 and the outer peripheral edge 103 of the bottom cover member 92, the distal shaft portion 122 is switched at the welding border as a switching point to move one round along a circumferential route R42 in the circumferential direction of the bore 30. When reaching the switching point again, the distal shaft portion 122 is moved toward the center of the bore 30 along a radial route R43 in the radial direction of the bore 30. When eventually returning to the starting point, the distal shaft portion 122 is pulled out axially from the caliper body 21.

According to the above-described eighth embodiment, the bottom cover member 92 is provided with a starting hole 140 serving as a starting point of friction stir welding. The starting hole 140 is formed at a position displaced from the center of the bottom cover member 92. Therefore, when the bottom cover member 92 receives rotational force from the welding tool 120 rotating at high speed, it is possible to prevent the bottom cover member 92 from rotating relative to the caliper body main unit 91 (i.e. from rotating together with the welding tool 120) also by the fitting between the fitting cylindrical surface 95 of the caliper body main unit 91 and the fitting cylindrical surface 100 of the bottom cover member 92.

Accordingly, it is possible to further suppress the occurrence of surface and interior defects in the friction stir welding process.

Further, because the bottom cover member 92 has a plurality of engagement recesses 135 provided on the distal end of the protrusion 45 at a plurality of circumferentially unequally spaced positions, respectively, the bottom cover member 92, which is not in point symmetry at the outer-surface constituting surface 102 side thereof due to the provision of the starting hole 140 can be positioned at one predetermined rotational position in order to place the starting hole 140 at a predetermined position relative to the caliper body main unit 91. In other words, if the starting hole 140 is placed somewhere other than the predetermined circumferential position, the three engagement recesses 135 of the bottom cover member 92 cannot be engaged with the three engagement projections 136 of the core jig 110. Consequently, there will be a step between the outer-surface constituting surface 102 of the bottom cover member 92 and the outer-surface constituting surface 96 of the caliper body main unit 91. This allows the worker to visually notice an error in installation of the bottom cover member 92. Accordingly, the starting hole 140 can be surely placed at the predetermined circumferential position, i.e. the friction stir welding starting point of the welding tool 120, which moves along an automatically set path.

Further, in the friction stir welding step, the distal shaft portion 122 of the welding tool 120 is moved from a position more remote from the central engagement recess 135 than the center of the bottom cover member 92 along the radial route R41 opposite to the direction in which the central engagement recess 135 exists, and moved one round along the circumferential route R42, and further moved along the radial route R43 in which the distal shaft portion 122 moves opposite to the direction of the radial route R41 to a position more remote from the central engagement recesses 135 than the center of the bottom cover member 92. Accordingly, it is possible to increase the distance between the three engagement recesses 135, on the one hand, and, on the other, the residual hole 68, and hence possible to suppress the influence exerted on the mechanical strength by the nearness of the residual hole 68 to the engagement recesses 135. It is also possible to suppress the influence exerted on the mechanical strength by the nearness of the friction-stir-welded part to the three engagement recesses 135.

The first to seventh embodiments may also be arranged such that a starting hole 140 into which the distal shaft portion 122 of the welding tool 120 can be inserted is formed at the friction stir welding starting point on the bottom cover member 92 in advance of the friction stir welding step to shorten the time required for the friction stir welding step.

The foregoing fifth to eighth embodiments may be arranged as follows. The engagement recess 130 or the engagement recesses 135 are not provided on the bottom cover member 92 but provided on the core jig 110, and the engagement projection 131 or the engagement projections 136 are not provided on the core jig 110 but provided on the bottom cover member 92.

It is also possible to temporarily fasten and fix the bottom cover member 92 to the caliper body main unit 91 before the friction stir welding step. However, this temporary fixing is simply for preventing loosening of the bottom cover member 92. Therefore, even if temporary fixing is performed, the bottom cover member 92 cannot be prevented from rotating together with the welding tool 120. In this regard, the fifth to eight embodiments exhibit advantageous effects.

In the foregoing first to eighth embodiments, the present invention has been explained with regard to the fist-type caliper 15, by way of example, in which the cylinder portion 25 is provided for only one side of he disk 12 and the claw portion 27 is formed at the other side of the disk 12, and in which the brake pads 14 are pressed by fluid pressure through one piston 22 provided for only one side of the disk 12. It should, however, be noted that the present invention is also applicable to an opposed piston type caliper in which the cylinder portion 25 is provided for each side of the disk 12. If the present invention is applied to such an opposed piston type caliper, it is only necessary for friction stir welding to be applied to one of the pair of opposed cylinder portions that is provided with an inlet hole. If necessary, friction stir welding may be applied to both the cylinder portions. The present invention is also applicable to a first or opposed piston type caliper in which two or more pistons are provided for one side of the disk 12. Although in the first to eighth embodiments a pair of brake pads 14 are provided for both sides, respectively, of the disk 12, the present invention is also applicable to a disk brake in which two or more pairs of brake pads are provided.

According to the foregoing embodiments, the disk brake includes a caliper body having a cylinder portion with a bore formed therein to receive a piston that presses with fluid pressure at least one of a pair of brake pads disposed at opposite sides, respectively, of a disk. The cylinder portion has a cylindrical shape and has an opening peripheral edge at the bottom side thereof. The disk brake further includes a bottom cover member to be fitted to the opening peripheral edge. The bottom cover member and the opening peripheral edge of the cylinder portion are integrally joined together by friction stir welding to form the bottom of the bore. The bottom cover member has a disk shape and is friction-stir-welded along the outer periphery thereof. The terminating point of the friction stir welding is within the boundaries of the bottom cover member. With this structure, a tool for friction stir welding can be moved without traversing the radial clearance between the bore and a core jig supporting the bottom cover member to integrally join the opening peripheral edge and the bottom cover member to be fitted to the opening peripheral edge. Accordingly, it is possible to obtain a caliper body having a favorable configuration.

In addition, the bottom cover member may have a protrusion provided on one side thereof that faces into the bore, and the terminating point of the friction stir welding may be within the boundaries of the protrusion. With this structure, even if the friction stir welding terminating point is within the boundaries of the bottom cover member, it is possible to ensure the distance between a residual hole formed at the friction stir welding terminating point and the bore. Accordingly, it is possible to improve durability against the load of brake fluid pressure during braking.

In addition, an inlet hole may be provided within the boundaries of the protrusion. The inlet hole extends through between the one side of the bottom cover member and the other side thereof to supply fluid pressure into the bore. With this structure, it is possible to ensure the length with which a piping member is fitted into the inlet hole.

In addition, the inlet hole may be formed at the friction stir welding terminating point. This structure allows a reduction in number of holes to be formed in the bottom. Accordingly, it is possible to improve durability against the load of brake fluid pressure during braking In addition, because the machining margin for the inlet hole is minimized, the machining time can be reduced.

In addition, an anti-rotation detent hole may be provided within the boundaries of the protrusion. The detent hole is fitted with an anti-rotation detent member of a piping plug connected to the inlet hole. With this structure, the distance between the detent hole and the bore can be ensured. Accordingly, it is possible to improve durability against the load of brake fluid pressure during braking.

In addition, the angle made by the friction stir welding terminating point and the detent hole at the center of the inlet hole may be not less than 45 degrees. With this structure, it is possible to prevent a worker from mistaking the residual hole, which is formed at the friction stir welding terminating point, and the detent hole for each other.

In addition, the detent hole may be formed at the terminating point of the friction stir welding. This structure allows a reduction in number of holes to be formed in the bottom. Accordingly, it is possible to improve durability against the load of brake fluid pressure during braking In addition, because the machining margin for the detent hole is minimized, the machining time can be reduced.

In addition, the protrusion may have a height not less than a half of the wall thickness of the outer periphery of the bottom cover member. This structure makes it possible to ensure the distance between the residual hole and the bore. Accordingly, it is possible to improve durability against the load of brake fluid pressure during braking.

In addition, the bottom cover member may be provided with an inlet hole extending through between one side and the other side thereof to supply fluid pressure into the bore, and the inlet hole may be formed at the terminating point of the friction stir welding. This structure allows a reduction in number of holes to be formed in the bottom. Accordingly, it is possible to improve durability against the load of brake fluid pressure during braking In addition, because the machining margin for the inlet hole is minimized, the machining time can be reduced.

In addition, the inlet hole of the bottom cover member may be displaced from the center of the bottom cover member. With this structure, when other holes are provided according to need, the holes can be favorably arranged.

In addition, the bottom cover member may have an engagement portion located in the bore to determine a circumferential position of the bottom cover member relative to the caliper body and to latch the bottom cover member in the circumferential position. This structure prevents the bottom cover member from rotating when receiving rotational force from the welding tool during the friction stir welding step. Accordingly, it is possible to suppress the occurrence of surface and interior defects on the caliper body.

In addition, the bottom cover member may have an engagement portion located on the protrusion to determine a circumferential position of the bottom cover member relative to the caliper body and to latch the bottom cover member in the circumferential position. This structure can suppress the influence of providing the engagement portion.

In addition, the engagement portion is provided at one position on the distal end of the protrusion. This structure can suppress the influence of providing the engagement portion.

In addition, there may be provided a plurality of the engagement portions on the distal end of the protrusion. This structure makes it possible to surely prevent the bottom cover member from rotating when receiving rotational force from the welding tool during the friction stir welding step.

In addition, the engagement portions may be provided on the distal end of the protrusion at equal pitches in the circumferential direction. This structure facilitates the setting of the bottom cover member. Accordingly, the friction stir welding step can be carried out efficiently.

In addition, the engagement portions may be provided on the distal end of the protrusion at unequal pitches in the circumferential direction. This structure enables the bottom cover member to be positioned to a single predetermined rotational position.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-244693, filed on Oct. 29, 2010, and priority under 35 U.S.C. section 119 to Japanese Patent Application No. 2011-144088, filed on Jun. 29, 2011. The entire disclosure of Japanese Patent Applications No. 2010-244693 and No. 2011-144088 including specification, claims, drawings and summary is incorporated herein by reference in its entirety.

What is claimed is:

1. A disk brake comprising:
    a caliper body having a cylinder portion with a bore formed therein to receive a piston that presses with fluid pressure at least one of a pair of brake pads disposed at opposite sides, respectively, of a disk, the cylinder portion having a cylindrical shape and having an opening peripheral edge at a bottom side thereof; and
    a bottom cover member to be fitted to the opening peripheral edge of the cylinder portion;
    the cylinder portion having a bottom of the bore, the bottom being formed by integrally joining the opening peripheral edge and the bottom cover member through friction stir welding;
    the bottom cover member having a disk shape, the bottom cover member being friction-stir-welded along an outer periphery thereof;
    wherein a terminating point of the friction stir welding is within boundaries of the bottom cover member,
    wherein the bottom cover member has a protrusion provided on one side thereof that faces into the bore,
    wherein a residual hole is provided at a terminating point of the friction stir welding within boundaries of the protrusion of the bottom cover member,
    wherein an inlet hole is provided within the boundaries of the protrusion, the inlet hole extending through between the one side of the bottom cover member and the other side thereof to supply fluid pressure into the bore,
    wherein an anti-rotation detent hole is provided within the boundaries of the protrusion, the detent hole being fitted with an anti-rotation detent member of a piping plug connected to the inlet hole, and
    wherein, when viewing the caliper body from the bottom cover member side, an angle defined by a line passing through a center of the inlet hole and the terminating point of the friction stir welding and a line passing through the center of the inlet hole and a center of the detent hole is not less than 45 degrees.

2. The disk brake of claim 1, wherein the inlet hole is displaced from a center of the bottom cover member.

3. The disk brake of claim 1, wherein the protrusion has a height not less than a half of a wall thickness of an outer periphery of the bottom cover member.

* * * * *